(12) United States Patent
Sakamoto et al.

(10) Patent No.: US 10,232,248 B2
(45) Date of Patent: *Mar. 19, 2019

(54) GAME MACHINE OPERATING DEVICE AND GAME MACHINE

(71) Applicant: OMRON Corporation, Kyoto-shi, Kyoto (JP)

(72) Inventors: Hitoshi Sakamoto, Ichinomiya (JP); Masaki Mizutani, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,351

(22) Filed: Jul. 20, 2017

(65) Prior Publication Data

US 2018/0056176 A1 Mar. 1, 2018

(30) Foreign Application Priority Data

Aug. 31, 2016 (JP) .................................. 2016-170235

(51) Int. Cl.
| | |
|---|---|
| *G07F 17/32* | (2006.01) |
| *A63F 9/24* | (2006.01) |
| *H01H 3/00* | (2006.01) |
| *A63F 13/90* | (2014.01) |
| *A63F 13/24* | (2014.01) |

(Continued)

(52) U.S. Cl.
CPC .............. *A63F 9/24* (2013.01); *A63F 13/218* (2014.09); *A63F 13/24* (2014.09); *A63F 13/90* (2014.09); *G07F 17/32* (2013.01); *H01H 3/00* (2013.01); *A63F 2300/1056* (2013.01); *G05G 2009/0474* (2013.01)

(58) Field of Classification Search
CPC ..... G07F 17/3202; G07F 17/3209; A63F 9/24
See application file for complete search history.

(56) References Cited

U.S. PATENT DOCUMENTS

| | | | | |
|---|---|---|---|---|
| 2011/0124411 | A1* | 5/2011 | Tanimura ............ | G07F 17/3211 463/31 |
| 2013/0265233 | A1* | 10/2013 | Obermeyer ............ | G05G 9/047 345/161 |

(Continued)

FOREIGN PATENT DOCUMENTS

| | | |
|---|---|---|
| JP | 2009-131509 A | 6/2009 |
| JP | 2011-104175 A | 6/2011 |
| JP | 2012-045338 A | 3/2012 |

*Primary Examiner* — Jay Trent Liddle
(74) *Attorney, Agent, or Firm* — Metrolexis Law Group, PLLC

(57) ABSTRACT

A game machine operating device mounted on a game machine with a game board and provided on a front side of the game board includes: an operation unit which receives an operation; and a projection unit which radiates light in a direction toward the game board to project a first image on an area in a field of view of a player viewing the game board. The projection unit includes: a first light source; and a light guide into which light emitted from the first light source is guided. The light guide has a light diffusion pattern formed on one or both of a front surface and a rear surface, wherein light is emitted through the light diffusion pattern to form the first image. A part on which the light diffusion pattern is formed is disposed to be directed in the direction toward the game board.

6 Claims, 21 Drawing Sheets

(51) Int. Cl.
*A63F 13/218* (2014.01)
*G05G 9/047* (2006.01)

(56) References Cited

U.S. PATENT DOCUMENTS

| | | | |
|---|---|---|---|
| 2015/0248822 A1* | 9/2015 | Okazaki | G07F 17/3209 |
| | | | 463/20 |
| 2015/0363997 A1* | 12/2015 | Onitsuka | G07F 17/3211 |
| | | | 463/32 |
| 2018/0056177 A1* | 3/2018 | Sakamoto | A63F 9/24 |

* cited by examiner

FIG. 3A
FIG. 3B
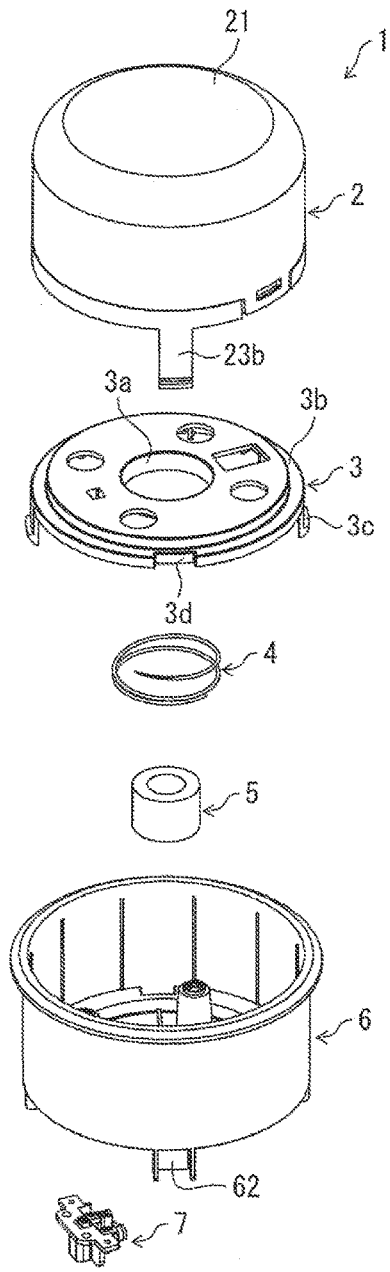
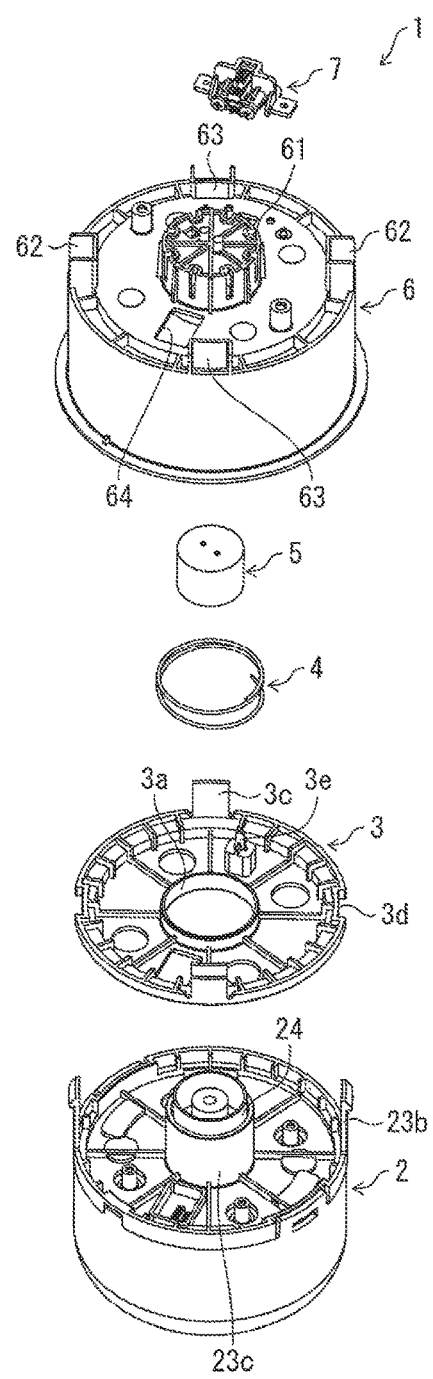

FIG. 7A
FIG. 7B
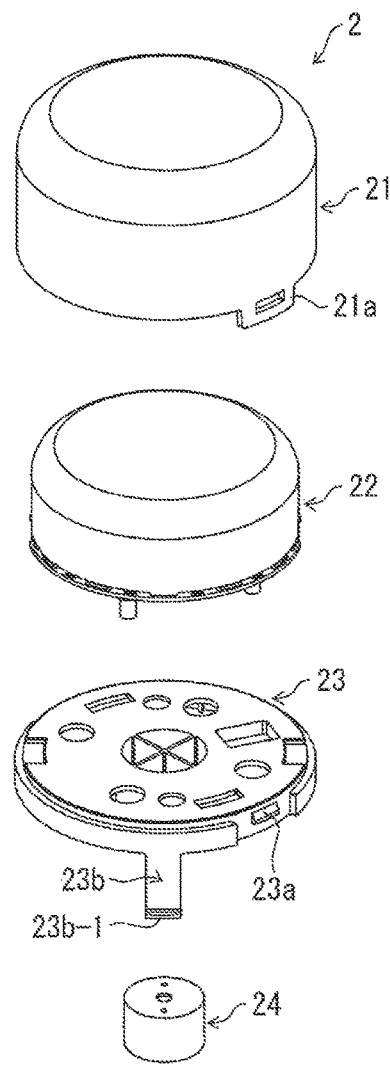
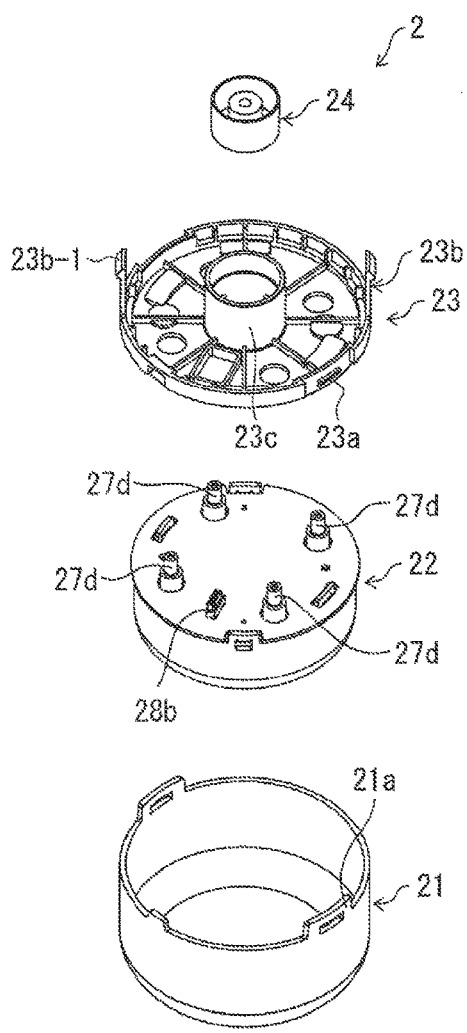

GAME MACHINE OPERATING DEVICE AND GAME MACHINE

CROSS-REFERENCE TO RELATED APPLICATION

This application is based on Japanese Patent Application No. 2016-170235 filed with the Japan Patent Office on Aug. 31, 2016, the entire contents of which are incorporated herein by reference.

FIELD

The disclosure relates to a game machine operating device and a game machine.

BACKGROUND

Conventionally, various game machines such as a pachinko machine and a pachinko slot machine are provided with a game machine operating device, and performances such as blink of the operation unit are executed to make players have expectations on the game.

Examples of a game machine operating device include a push button device equipped with a push button unit as an operation unit and include a lever operation device equipped with a lever. As performances of the game machine operating device, there is known a method in which the operation unit is made to emit light and in which images are displayed on a display surface provided on the operation unit.

For example, JP 2012-045338 A discloses a push button device in which a push button unit is provided with a screen surface which functions as a display surface and in which a projection unit and a liquid crystal display device are disposed in the push button unit. In the push button device, it is possible to radiate light from the projection unit to display, on the screen surface, an image displayed on the liquid crystal display device.

Further, JP 2009-131509 A discloses a lever operation device in which a spherical operation piece provided on a tip of a lever is made to emit light. JP 2011-104175 A discloses a lever operation device in which a plurality of light emission units are provided on a periphery of a lever and in which the periphery of the operation lever unit is made to emit light.

SUMMARY

Not only in the push button device of JP 2012-045338 A but also in a game machine, a push button device is often disposed on the front face of the game machine but on the lower side of the game board.

However, a player is usually playing a game while viewing the motion of game balls flowing down in a game area of the game board and performances of a display screen provided on the game board. That is, the player is gazing at the game board. For this reason, the push button device disposed on the lower side of the game board is not paid attention to, and the images displayed on the screen surface of the push button unit are not likely to be noticed by the player, either.

In the lever operation devices of JP 2009-131509 A and JP 2011-104175 A, the operation piece at the tip of the lever is made to emit light, and the periphery of the operation lever unit is made to emit light; however, the player gazing at the game board is not likely to notice the light, either.

To address this issue, information for operation is conventionally displayed on the display screen to prompt to operate a liquid crystal push button device and a lever operation device on the game board.

An aspect of the present invention has been made in view of the above problem, and an object of an embodiment of the invention is to provide a game machine operating device and a game machine which can execute an impressive performance. With the game machine operating device and the game machine, it is possible to make the player notice that the game machine operating device is there and to make the player operate the game machine operating device, without taking a measure such as displaying on the display screen on the game board an image to prompt the player to operate, even when the player is gazing at the game board.

A game machine operating device is mounted on a game machine equipped with a game board, and the game machine operating device is provided on a front side of the game board and includes: an operation unit which receives an operation; and a projection unit which radiates light in a direction toward the game board to project a first image on an area in a field of view of a player viewing the game board. The projection unit includes: a first light source; and a light guide into which light emitted from the first light source is guided. The light guide has a light diffusion pattern formed on one or both of a front surface and a rear surface, wherein light is emitted through the light diffusion pattern to form the first image. A part on which the light diffusion pattern is formed is disposed to be directed in the direction toward the game board.

With the above configuration, light is radiated from the projection unit in a direction toward the game board, so that the first image is projected on the area in a field of view of the player viewing the game board and is displayed. Therefore, the player can view the displayed first image even when the player is gazing at the game board.

This arrangement enables a novel impressive performance such as novel image display which is realized by radiating light in the direction toward the game board from the game machine operating device, which image display is not conventionally performed, whereby it is possible to broaden the variety of performances on a game machine on which the game machine operating device is mounted.

Further, it is possible to make noticeable the existence of a game machine operating device functioning as an emitting source of light to form the first image. Therefore, it is possible to cause the player to notice the game machine operating device and to naturally prompt the user to operate the operation unit without taking a measure such as displaying, on the display screen provided on the game board, an image which prompts the user to operate.

In this case, for example, when an image is displayed as the first image so as to prompt the user to operate the operation unit, it is possible to more surely prompt the user to operate. Further, it is not necessary to take a measure such as displaying, on the display screen provided on the game board, an image to prompt to operate the operation unit. Therefore, it is possible to use the display screen for other performances, whereby it is possible to broaden the variety of performances on the game machine on which the operation unit is mounted.

Further, according to the above configuration, the light to form the first image is emitted not from an end face along a thickness direction of the light guide but from a wide surface with the light diffusion pattern being used. Therefore, it is easier to secure an area contributing the display of the first image than with the configuration in which light is emitted from an end face along the thickness direction of the light guide; whereby the first image can be easily displayed large.

Further, it is easy to set the position of the display (radiation) of the first image on the transparent plate by adjusting the angle between the surface on which the light diffusion pattern is formed and the transparent plate; whereby it is easy to display (radiate) the first image at an aimed position on the transparent plate.

Further, unless light is introduced into the light guide, light is not emitted from the light diffusion pattern; thus, the first image is not viewed at a time other than a time of performance, and the effect of performance is not reduced at all.

Further, by changing light diffusion patterns, the first image to be displayed on the transparent plate is easily changed; therefore, a common configuration can be used between different types of game machines for cost reduction, and at the same time, performances can be executed depending on the game machine.

The game machine operating device according to one or more embodiments of the present invention may further be configured as follows. The game machine is equipped with a transparent plate covering a front side of the game board. The projection unit radiates light toward the transparent plate. The projection unit projects, as the first image, an image which is reflected by the transparent plate and is viewed by a player.

With the above configuration, the first image, which is reflected by the transparent plate and is viewed by a player, is displayed on the transparent plate disposed to cover the game board. This arrangement enables a novel impressive performance such that an image is displayed from the game machine operating device by using the reflection by the transparent plate.

The game machine operating device according to one or more embodiments of the present invention may further be configured as follows. The operation unit is a push button unit which is moved by a push-in operation. The push button unit includes a lens member and a performance unit. The lens member is configured with a light guide which is in an inverted cup-shape and is provided with a light diffusion pattern formed on one or both of a front surface and a rear surface of the upper surface. The light diffusion pattern displays an image for performance which is directly viewed by the player. The performance unit has a second light source which introduces light into the lens member. The projection unit is configured with the performance unit. The light diffusion pattern through which light is emitted to form the first image is formed on one or both of a front surface and a rear surface of an inclined or rounded part ranging from the upper surface to a trunk part of the lens member.

According to the above configuration, the performance unit has a function as the projection unit, and the light diffusion pattern for the first image is formed on the inclined or rounded part ranging from the upper surface to the trunk part of the inverted cup-shaped lens member equipped on the push button unit. The upper surface of the inverted cup-shaped lens member holds thereon the light diffusion pattern for the image for performance which is directly viewed by the player. With this arrangement, the number of components is not greater than a configuration in which the projection unit is separately provided, and no new component is added; therefore, even when a new function is added to display the first image, the game machine operating device equipped with the push button unit is not increased in size.

The game machine operating device according to one or more embodiments of the present invention may further be configured as follows. The inclined or rounded part of the lens member further has thereon a light diffusion pattern to display a second image which is directly viewed by the player.

With the above configuration, other than the first image to be displayed on the transparent plate, the second image which is directly viewed by the player is displayed by using light emitted from the lens member in all directions from the push button unit; whereby performance can be more impressive.

Further, the game machine operating device of one or more embodiments of the present invention may be equipped on a game machine. This arrangement can provide a game machine having a wide variety of performances.

According to one or more embodiments of the present invention, it is possible to provide a game machine operating device and a game machine which can perform an impressive performance. By the impressive performance, it is possible to make the player notice that the game machine operating device is there and to make the player operate the game machine operating device, without taking a measure such as displaying on the display screen on the game board an image to prompt the player to operate, even when the player is gazing at the game board.

BRIEF DESCRIPTION OF THE DRAWINGS

FIGS. 3A and 3B are exploded perspective views of the above push button device, where FIG. 3A is an exploded perspective view viewed from above and FIG. 3B is an exploded perspective view viewed from below;

FIGS. 7A and 7B are exploded perspective views of a main body equipped on the above push button device, where FIG. 7A is an exploded perspective view viewed from above and FIG. 7B is an exploded perspective view viewed from below.

FIG. 11A is an exploded perspective view viewed from above and FIG. 11B is an exploded perspective view viewed from below;

FIG. 14A shows the push button device viewed from above and FIG. 14B shows the push button device viewed from the side;

FIG. 18A shows a principle how light is emitted from the light diffusion pattern, FIG. 18B shows the appearance when a light source is on, and FIG. 18C shows the appearance when the light source is off;

FIG. 19A shows the push button device viewed from above and FIG. 19B shows the push button device viewed from the side;

DETAILED DESCRIPTION

Hereinafter, embodiments of the present invention will be described in detail with reference to the drawings. Although a push button device equipped with an operation push button is exemplified as a game machine operating device, the present invention can be applied to other game machine operating devices such as a lever operation device equipped with an operation lever unit. The point is that the present invention can be applied to any device if the device is a game machine operating device disposed on a front side of a game machine. As a projection unit in which light is radiated in the direction toward a game board, a projection unit is exemplified in which light is radiated toward a transparent plate covering the front side of the game board so that a first image is reflected by the transparent plate and is viewed. However, for example, it is possible to project the first image on a resin part of a front frame of a front door surrounding the periphery of the game board or to provide a screen on the front frame or the periphery of the front frame to project the first image on the screen. As the game machine on which the game machine operating device is mounted, a pachinko machine is exemplified in each embodiment. However, the present invention can be applied to a game machine if the game machine has a transparent plate, such as a glass plate, covering the game board such as a pachinko slot machine.

First Embodiment

1. Schematic Configuration of Pachinko Machine 100

Figure 1:
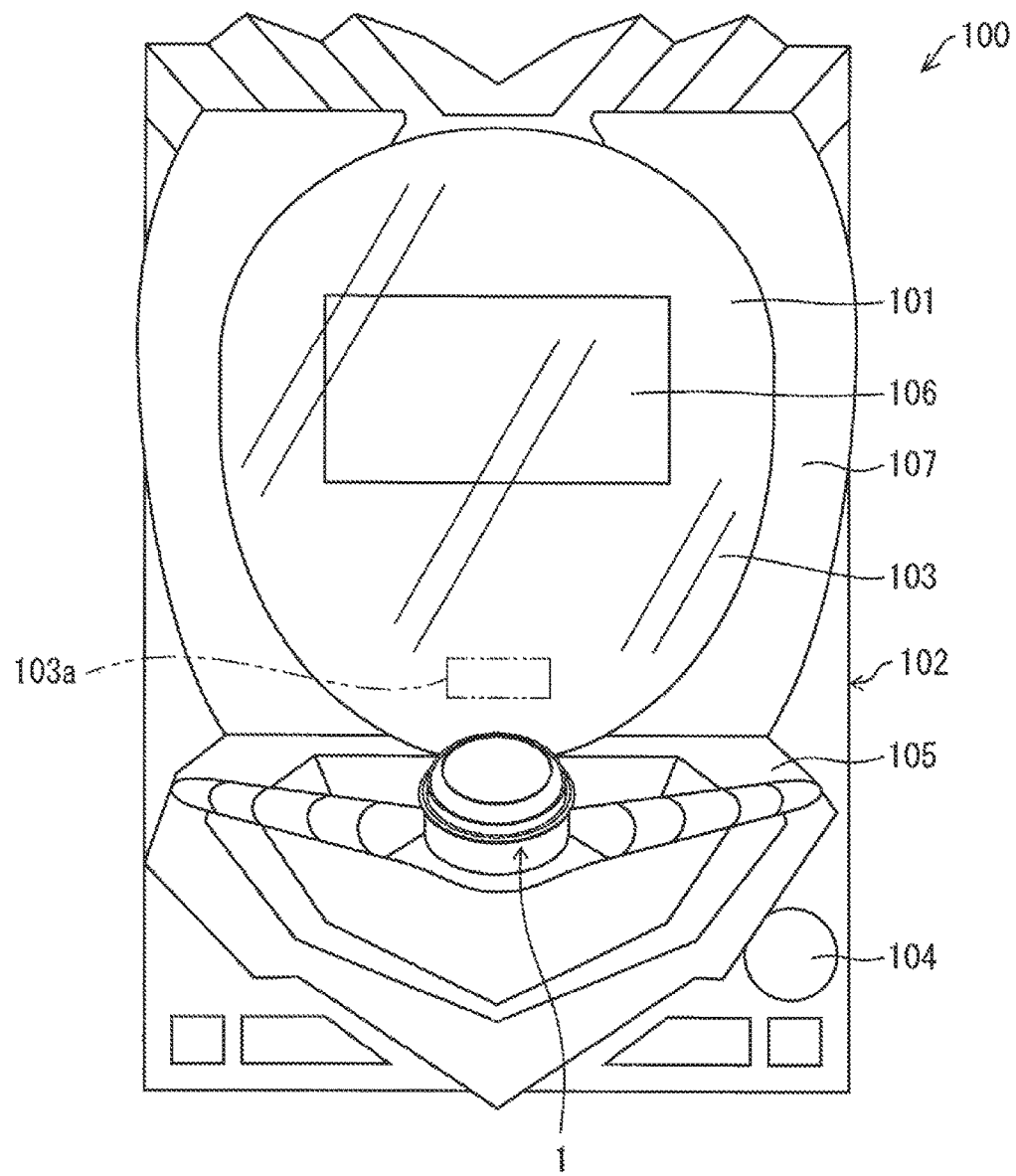
FIG. 1 is a schematic front view of a pachinko machine on which a push button device according to an embodiment of the present invention is mounted.

First, a description is given to a schematic configuration of a pachinko machine 100 on which a push button device 1 according to the embodiment is mounted. FIG. 1 is a schematic front view of the pachinko machine 100 on which the push button device 1 according to the embodiment is mounted.

As shown in FIG. 1, the pachinko machine 100 is equipped with: a game board 101 on which game balls are launched; and a front door 102 which is openable with respect to the game board 101. The front door 102 supports a glass plate (transparent plate) 103 which is disposed on the front side of the game board 101 with a predetermined interval between the glass plate 103 and the game board 101. The front door 102 has a front frame 107 disposed to surround the glass plate 103. In the lower part of the front door 102 is provided an upper tray 105. On the right side (viewed from the front) of the upper tray 105 is provided a handle 104 with which a player adjusts strength of launching balls to play a game.

Between the glass plate 103 and the game board 101, there is formed a game area in which game balls move. When a player grasps the handle 104 and turns the handle 104 in the clockwise direction, game balls reserved in the upper tray 105 are each launched from a launching device (not shown) by a hitting force depending on the rotation angle of the handle 104. Each of the launched game balls is guided by a guide member (not shown) to the upper position in the game area, and the game ball falls down along the surface of the game board 101. When falling down, the traveling direction of the game ball is changed by touching game nails (not shown), pinwheels (not shown), and the like disposed in the game area. In the game area, there are provided a plurality of start ports (not shown), prize ports (not shown), gates (not shown), and the like as accessories related to prize and lottery. When a game ball enters a start port or a prize port, prize balls (game balls) are dispensed to the upper tray 105, and the number of the prize balls depends on the port which the game ball enters. The game balls reserved in the upper tray 105 can be dropped into a box (not shown) disposed below the upper tray 105.

For example, when a game ball enters a start port, a special performance is started, such as a jackpot lottery which is different from normal performances. The prize ports include a big prize-port and a small prize-port, and the big prize-port is opened depending on the result of a jackpot lottery. When a jackpot lottery is hit and the big prize-port is opened, the player can enjoy a jackpot game in which the player can get a great number of prize balls.

On the outside of the game area, there are a display screen 106, a lighting device for performance (not shown) which decorates the game board 101 and the surrounding area of the game board 101 with light, a performance accessory (not shown), a speaker (not shown), and the like.

On the display screen 106 are displayed various display objects, for example, a decorative symbol which notifies of the result of a jackpot lottery, a character or an item which performs an announcement performance, a reservation display image which indicates that a jackpot lottery is reserved, and other objects. The lighting device for performance executes light performance by emitting light depending on the progress of the game by the player, changing a pattern of turn-on and blink, or changing luminescence colors. The performance accessory moves the accessory itself and executes light performance by, for example, rotating or moving while the light emitting element is on. The speaker performs sound performance by outputting music, voice, sound effect, and the like.

Further, in the vicinity of the upper tray 105 is provided the push button device 1 according to the embodiment. The push button device 1 is for a player to operate an operation push button to input operation information. A performance image is displayed on the display screen 106 to prompt to operate the push button device 1, and the player operates the push button device 1 following the performance image, so that changing of performance images or other operations are accordingly executed.

The push button device 1 is equipped with light performance function. The push button device 1 executes, in the same manner as the lighting device for performance, light performance by changing patterns of turn-on and blink, or changing luminescent color, depending on the progress of the game by the player.

Further, although a detailed description will be given later, the push button device 1 according to the embodiment also executes a performance in which light is radiated to the glass plate 103 covering the game board 101 so that the light is reflected by the glass plate 103 for the player to view a first image. The first image is projected on an area 103a on the glass plate 103.

2. Configuration of Push Button Device 1

Figure 2:
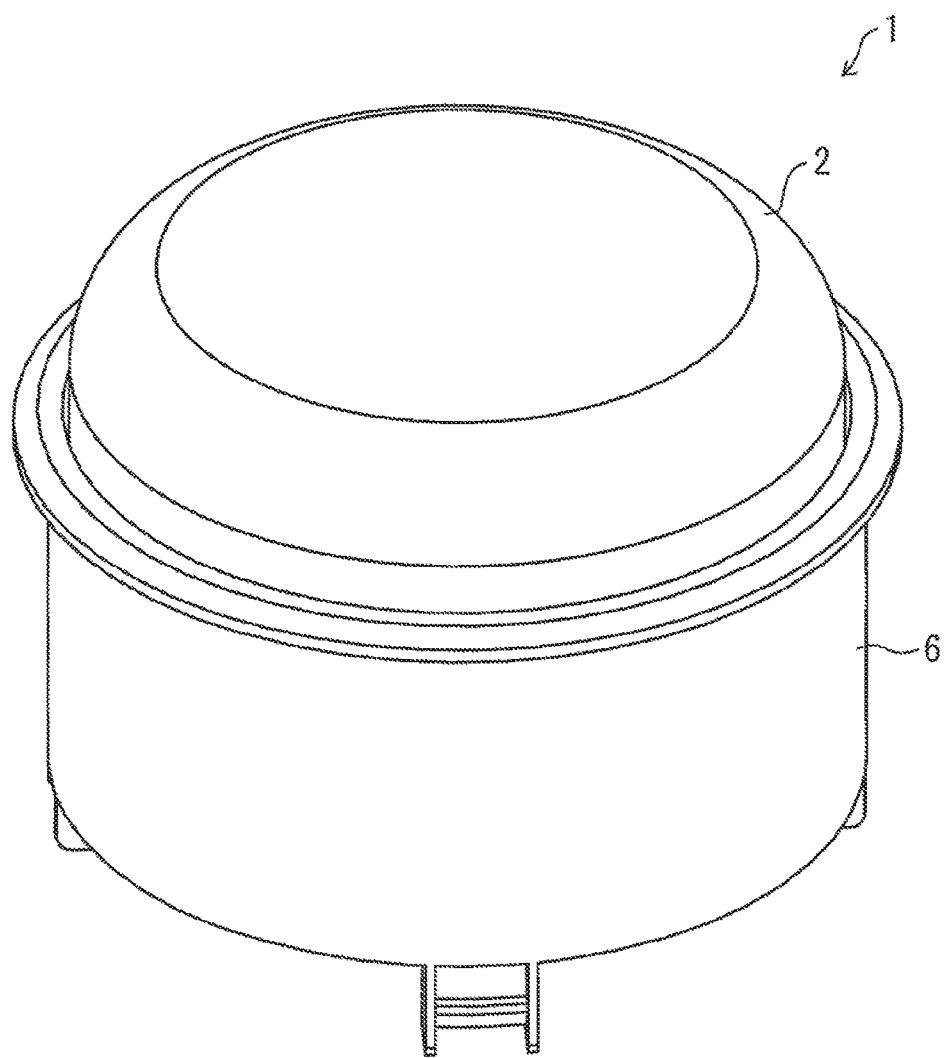
FIG. 2 is a perspective view showing an outer appearance of the push button device according to the embodiment of the present invention.

First, a configuration of the push button device 1 is described with reference to FIG. 2 to FIGS. 7A and 7B. FIG. 2 is a perspective view showing an outer appearance of the push button device 1. The push button device 1 is assembled on the pachinko machine 100 such that a push-in direction is directed downward. Therefore, hereinafter, a description is made assuming that the push-in direction of the push button device 1 is the downward direction and that the direction opposite to the push-in direction is the upward direction.

Figure 4:
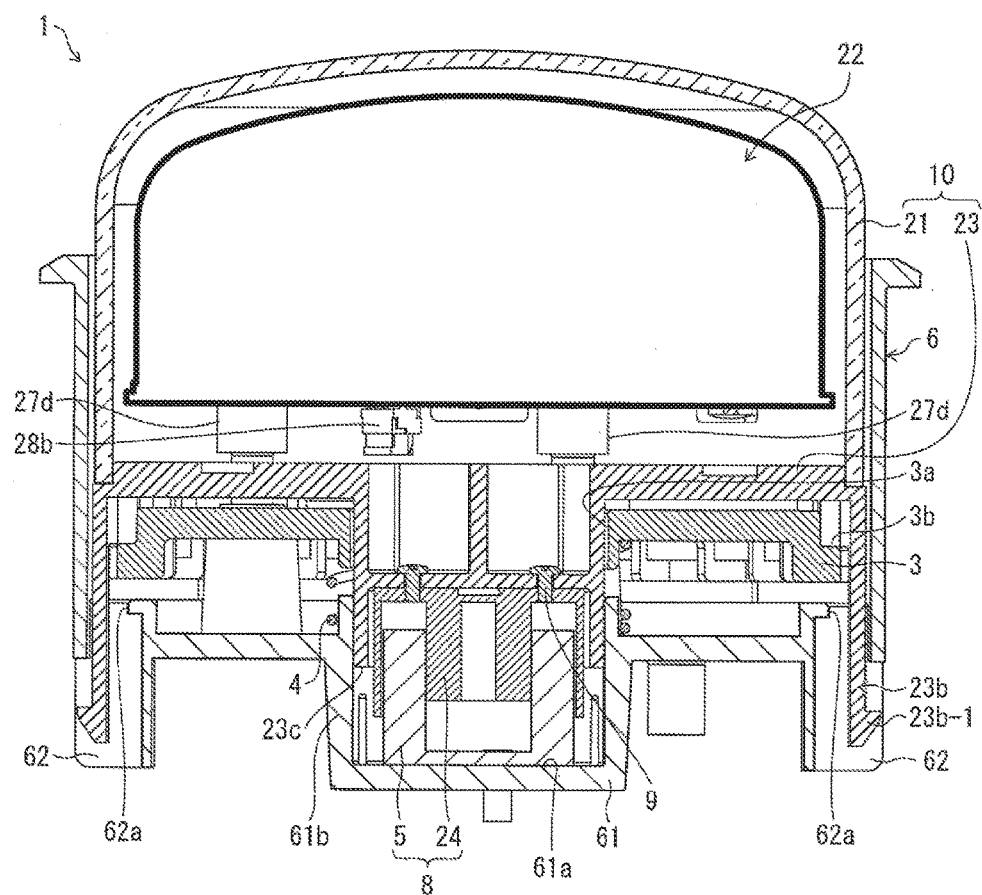
FIG. 4 is a sectional view of the above push button device when not operated.
Figure 5:
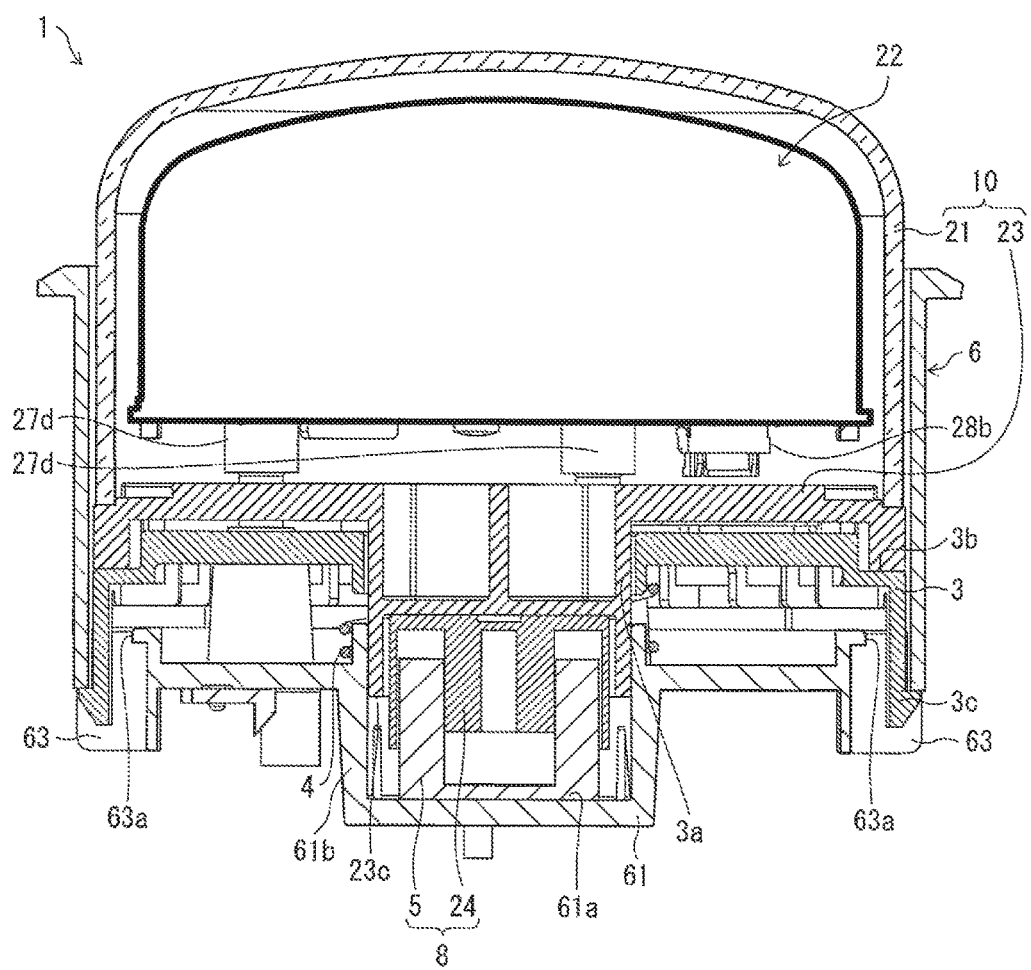
FIG. 5 is a sectional view of the above push button device when not operated.
Figure 6:
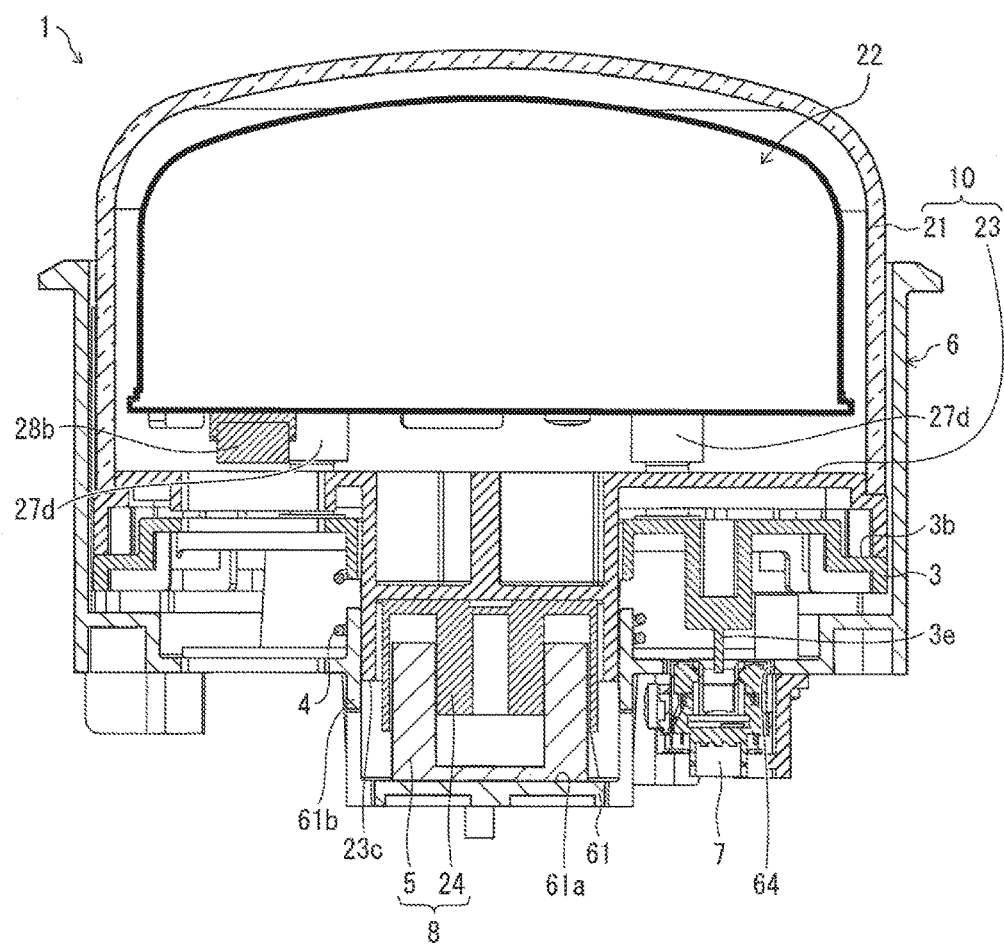
FIG. 6 is a sectional view of the above push button device when not operated.

FIGS. 3A and 3B are exploded perspective views of the push button device 1. FIG. 3A is an exploded perspective view viewed from above. FIG. 3B is an exploded perspective view viewed from below. FIG. 4 to FIG. 6 are main part sectional views of the push button device 1 when not operated, and the drawings show different cross-sections along an operation direction (vertical direction) of the push button device 1. Note that in FIG. 4 to FIG. 6, illustration of the cross-sectional configuration of a light performance unit 22 (to be described later) is appropriately omitted. FIGS. 7A and 7B are exploded perspective views of a main body 2 equipped on the push button device 1. FIG. 7A is an exploded perspective view viewed from above. FIG. 7B is an exploded perspective view viewed from below.

As shown in FIGS. 3A and 3B to FIG. 6, the push button device 1 is equipped with the main body (push button unit) 2, a lower guide (support) 3, a return spring (biasing part) 4, a voice coil motor securing part 5, a case 6, and a sensor 7.

The case 6 has an approximately cylindrical shape with a bottom, is a member to hold different parts of the push button device 1, and is connected to various types of devices of a game machine or the like which is equipped with the push button device 1. The case 6 is equipped with a voice coil motor holding part 61, upper guide restriction parts 62, lower guide restriction parts 63, and a sensor mounting window 64.

The voice coil motor holding part 61 is provided at the central part of the case 6 and is configured with a bottom surface 61a and a wall 61b having an approximately cylindrical shape.

The upper guide restriction parts 62 are each formed to protrude in the downward direction, at two opposing positions, on a bottom surface outer circumference of the case 6. In each of the upper guide restriction parts 62, there is formed a hole 62a.

Further, in the same manner as the upper guide restriction parts 62, the lower guide restriction parts 63 are each formed to protrude in the downward direction, at two opposing positions, on the bottom surface outer circumference of the case 6. In each of the lower guide restriction parts 63, there is formed a hole 63a.

The sensor mounting window 64 is formed in the bottom surface of the case 6 and is a window in which the sensor 7 is mounted.

The sensor 7 is fixed in the sensor mounting window 64 of the case 6 with a bolt or the like. The sensor 7 is a photo interrupter which has a light emitting unit (not shown) and a light receiving unit (not shown) to detect an object entering and exiting an object detection space formed between the light emitting unit and the light receiving unit. The sensor 7 sends, to a controller (not shown) of a device equipped with the push button device 1, an off-signal when no object is in the object detection space and an on-signal when an object is in the object detection space.

The voice coil motor securing part (fixing member) 5 is disposed inside the voice coil motor holding part 61 of the case 6 and is fixed on the bottom surface 61a of the voice coil motor holding part 61 with a bolt or the like. The voice coil motor securing part 5 corresponds to a mover in a voice coil motor and has a coil in a cylindrical shape. As described above, in the push button device 1 according to the embodiment, a part equipped with a coil which needs to be energized is fixed; thus, wiring is simple, whereby the configuration of the push button device 1 can be simpler. Note that the voice coil motor securing part 5 functions as a voice coil motor (drive unit) 8 integrally together with a voice coil motor movable part (movable part) 24 equipped on the main body 2 (to be described later).

The return spring 4 is a coil spring. The return spring 4 is disposed on the central part on the upper side of the bottom surface of the case 6 so as to contain therein the voice coil motor 8. One end of the return spring 4 is in contact with the case 6, and the other end is in contact with the lower guide 3. In the state shown in FIG. 4, the return spring 4 is compressed with respect to a natural length due to weights of a cover 21, an upper guide 23, the voice coil motor movable part 24, and the lower guide 3 of the main body 2. Thus, when not operated, the return spring 4 biases upwardly the cover 21, the upper guide 23, the voice coil motor movable part 24, and the lower guide 3 of the main body 2.

The lower guide 3 has an approximately disc-like shape having a hole 3a formed at the central part thereof, and when the push button device 1 is operated, the lower guide 3 supports an operation body 10 equipped on the main body 2. The lower guide 3 has: a step 3b formed on the outer circumference; a pair of latching portions 3c which extend in the downward direction from the step 3b and tip ends of which extend to the outer circumference side; and a light shield 3e provided above the object detection space of the sensor 7. The lower guide 3 supports the cover 21 with the step 3b being in contact with the cover 21 of the main body 2. Further, the lower guide 3 is disposed such that the latching portions 3c are inserted in the holes 63a of the lower guide restriction parts 63 of the case 6.

When not operated (when the operation body 10 is at a standard position), the lower guide 3 is biased in the upward direction by the return spring 4; however, the latching portions 3c are at a first position at which the latching portions 3c are latched to the lower end face of the lower guide restriction parts 63, and the latching restricts the lower guide 3 from moving in the upward direction. When the push button device 1 is operated, the lower guide 3 moves to a second position at which the lower end of the lower guide 3 is in contact with the case 6, and the lower guide 3 is restricted from moving in the downward direction. Further, in the step 3b of the lower guide 3, there are formed cutouts 3d at positions corresponding to the upper guide restriction parts 62 of the case 6. Note that in a direction perpendicular to the push-in direction, the lower guide 3 has a predetermined interval (clearance) between the lower guide 3 and the case 6.

As shown in FIGS. 7A and 7B, the main body 2 is equipped with: the operation body 10 configured with the cover 21 and the upper guide 23 being integrated with each other (see FIG. 4); the light performance unit 22; and the voice coil motor movable part 24.

The operation body 10 is a member which moves in the downward direction in response to a push-in operation by an operator, and is configured with the cover 21 and the upper guide 23 being integrated with each other. The operation body 10 is equipped with the cover 21 and the upper guide 23. Note that in a direction perpendicular to the push-in direction, the operation body 10 has a predetermined interval (clearance) between the operation body 10 and the case 6.

The cover 21 is a member having an approximately cylindrical shape with a lid, and the light performance unit 22 is disposed in a hollow part of the cover 21. Further, the cover 21 has a pair of engagement holes 21a formed at opposing positions in the lower outer circumference.

The light performance unit 22 executes light performance. Although details will be described later, projecting portions 27d and a connector 28b protrude from a bottom surface of the light performance unit 22. The projecting portions 27d are used to fix the light performance unit 22 to the case 6 with bolts or the like, and the connector 28b is used to supply electric power and to input control signals.

The upper guide 23 is a member disposed below the light performance unit 22 to guide movement of the cover 21. The upper guide 23 is formed in an approximately disc-like shape and is provided with engagement claws 23a, drooping parts 23b, a voice coil motor holding part (projecting portion) 23c.

The engagement claws 23a are formed at the positions, on the outer circumferential surface of the upper guide 23, corresponding to the engagement holes 21a of the cover 21 so as to engage with the engagement holes 21a of the cover 21. With this arrangement, the upper guide 23 and the cover 21 are integrated while holding therebetween the light performance unit 22.

The drooping parts 23b are formed, at the two opposing positions on the outer circumference, to extend in the downward direction. Further, the drooping parts 23b are formed at the positions corresponding to the cutouts 3d of the lower guide 3 and the upper guide restriction parts 62 of the case 6, and each of the drooping parts 23b has a latching portion 23b-1 at the lower end thereof.

The voice coil motor holding part 23c is formed at the central part of the push button device 1 and has a cylindrical shape which extends in the downward direction and the lower side of which is open. Inside the voice coil motor holding part 23c, there is disposed the voice coil motor movable part 24. The voice coil motor holding part 23c passes through the hole 3a of the lower guide 3 and is slidably in contact with the wall 61b of the voice coil motor holding part 61 of the case 6.

The voice coil motor movable part 24 is disposed in the voice coil motor holding part 23c of the upper guide 23 and is fixed on the voice coil motor holding part 23c with bolts 9 (see FIG. 4). Therefore, the voice coil motor movable part 24 moves integrally with the operation body 10. The voice coil motor movable part 24 corresponds to a stator of the voice coil motor 8 and is equipped with a permanent magnet and a yoke.

3. Description of Operation of Push Button device 1

Figure 8:
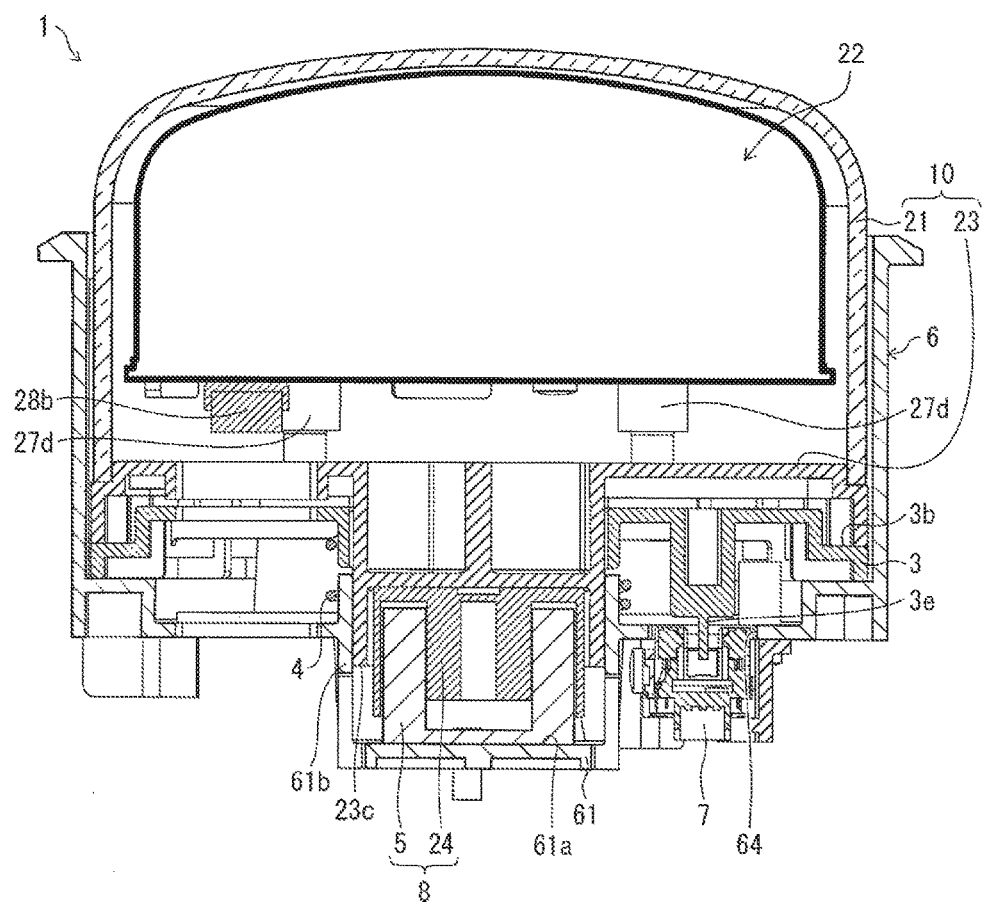
FIG. 8 is a sectional view showing the above push button device when operated.
Figure 9:
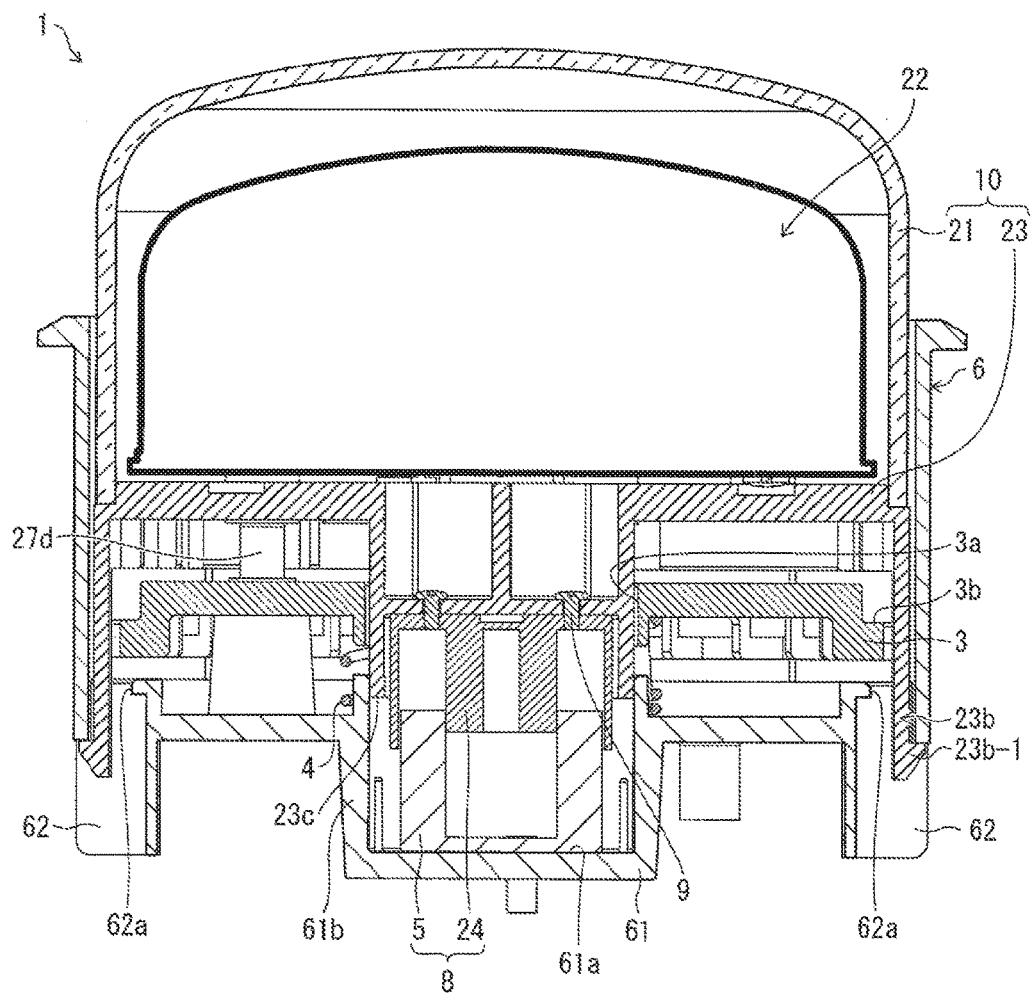
FIG. 9 is a sectional view of the above push button device when a voice coil motor is driven.

Next, a description is given to how the push button device 1 operates, with reference to FIG. 8 and FIG. 9. FIG. 8 is a main part sectional view of the push button device 1 when operated and is a sectional view corresponding to FIG. 6.

In the state shown in FIG. 6, the operation body 10 is at the standard position which is the position at the time of non-operation, and the lower guide 3 is at the first position. When an operator performs a push-in operation to apply a pressing force to the cover 21, the operation body 10 (the cover 21 and the upper guide 23 engaged with the cover 21) positioned at the standard position, the lower guide 3 being in contact with the upper guide 23, and the voice coil motor movable part 24 are moved in the downward direction as shown in FIG. 8. By this movement, the return spring 4 is compressed, the lower guide 3 moves to the second position, the light shield 3e gets into the object detection space of the sensor 7, and the push button device 1 thus turns to an on-state.

At this time, the voice coil motor holding part 23c of the upper guide 23 slides on the wall 61b of the voice coil motor holding part 61 of the case 6, and the cover 21 is thus guided. In other words, the wall 61b guides the movement of the operation body 10 when the push button device 1 is operated.

In a push button device in which an outer circumference of a cover slides when operated, if the outer circumference part of the cover is pushed at the time of operation, the cover moves while being inclined; therefore, the push button device does not turn to an on-state in some cases. In addition, because the cover slides being inclined, there is also a problem that the cover and the case get caught on each other and that the cover does not slide smoothly.

On the other hand, in the push button device 1, the central part of the push button device 1 slides when the push button device 1 is operated (the operation body 10 moves). Therefore, even if the outer circumference part of the upper surface of the cover 21 is pushed, the cover 21 moves being guided by the upper guide 23 sliding on the central part of the push button device 1, and the cover 21 and the upper guide 23 move in the downward direction, being almost horizontal. Thus, the lower guide 3 moves in the downward direction, being almost horizontal. As a result, the push button device 1 can easily turn to an on-state even if any part of the cover 21 is pushed; and because the cover 21 moves in the downward direction, being horizontal, the cover 21 slides smoothly and is excellent in operability.

When the push-in operation on the push button device 1 is finished, the biasing force of the return spring 4 returns the cover 21, the upper guide 23, the voice coil motor movable part 24, and the lower guide 3 to the position at the time of non-operation, and the push button device 1 thus returns to the state at the time of operation shown in FIG. 6. At this time, the latching portions 3c of the lower guide 3 are latched to the case 6, and the lower guide 3 is at the first position; and the operation body 10 can thus return to the standard position.

FIG. 9 is a main part sectional view showing the push button device 1 when the voice coil motor 8 is driven (at the time of operation) and is a sectional view corresponding to FIG. 4.

When the coil equipped on the voice coil motor securing part 5 of the voice coil motor 8 is supplied with current in a predetermined direction, the voice coil motor movable part 24 is moved by magnetic force in the direction in which the voice coil motor movable part 24 moves away from the voice coil motor securing part 5, that is to say, in the upward direction. Thus, the operation body 10 (the upper guide 23 and the cover 21), on which the voice coil motor movable part 24 is fixed, also moves integrally in the upward direction (protruding position). At this time, as shown in FIG. 8, the latching portions 23b-1 of the drooping parts 23b of the upper guide 23 are latched to the upper guide restriction parts 62 of the case 6; thus, there is a limitation in the amount of the upward movement of the upper guide 23, and the voice coil motor movable part 24 and the cover 21 moving integrally with the upper guide 23.

Then, when the supply of current to the voice coil motor 8 is stopped, the voice coil motor movable part 24 returns from the protruding position to the state at the time of non-operation (the standard position) as shown in FIG. 4 due to the weight of the operation body 10 and the voice coil motor movable part 24.

Further, if the voice coil motor 8 is supplied with current in the direction opposite to the above direction when the push button device 1 is not operated, magnetic force moves the voice coil motor movable part 24 in the downward direction, whereby the push button device 1 is brought into the state shown in FIG. 9. Thus, the light shield 3e of the lower guide 3 moving integrally with the voice coil motor movable part 24 gets into the object detection space of the sensor 7, and the push button device 1 turns to an on-state.

Then, when the supply of the current to the voice coil motor 8 is stopped, the biasing force of the return spring 4 returns the voice coil motor movable part 24 to the state of non-operation shown in FIG. 6.

As described above, the cover 21 of the push button device 1 can be moved up and down by energization of the voice coil motor 8, and this operation can provide a high performance effect.

As a way of moving up and down the cover 21, two ways can be considered. In one of the two ways, the cover 21 is moved in the upward direction by using the voice coil motor 8, and the cover 21 is returned to the non-operation position by the weight thereof. In the other of the two ways, the cover 21 is moved in the upward direction by using the voice coil motor 8, and the cover 21 is moved in the downward direction by reversing the direction of the current flowing through the voice coil motor 8. Alternatively, to the contrary, another way may be used in which the cover 21 is moved in the downward direction by using the voice coil motor 8, and then, the cover 21 is moved in the upward direction by using the biasing force of the return spring 4 or by reversing the direction of the current flowing through the voice coil motor 8.

Further, pulsed current or the like can be applied to the voice coil motor 8 to give small vertical vibrations to the cover 21, thereby vibrating the push button device 1. By adjusting the current (for example, pulse width or the like) applied to the voice coil motor 8, it is possible to arbitrarily set how to vibrate the push button device 1.

Further, the light performance unit 22 may execute a light performance while the sensor 7 is outputting a signal which represents an on-signal. Such a configuration enables the push button device 1 to emit light in synchronism with the vertical movement of the cover 21, thereby providing a high performance effect.

As described above, regarding the push button device 1, when a push-in operation is performed, the voice coil motor holding part 23c of the upper guide 23 equipped on the operation body 10 slides with respect to the wall 61b of the voice coil motor holding part 61 of the case 6, at the central part of the push button device 1. Further, the voice coil motor 8 is disposed inside the voice coil motor holding part 23c and the wall 61b which slide on each other as described above.

Thus, the push button device 1 can be a push button device excellent in operability, and in addition, a performance can be executed such as moving the operation body 10 up and down and vibrating the operation body 10 by causing the voice coil motor 8 to operate, whereby a high performance effect can be provided.

Further, because the up and down movement and the vibration of the operation body 10 are achieved by using the voice coil motor 8, it is not necessary to use a mechanical mechanism such as gears, like a conventionally used push button device; thus, the push button device 1 can be simply configure and can be downsized.

Further, because the up and down movement and the vibration of the operation body 10 are achieved by the magnetic force of the voice coil motor 8, even if an operator operates the push button device 1 while the operation body 10 is moving up and down or vibrating, the push button device 1 is not likely to be damaged. In addition, because the operation body 10 is moved by magnetic force, the operation body 10 can be moved in a shorter time than when a mechanical mechanism is used. Thus, the push button device 1 can execute performances including not only moving up and down but also vibrating, whereby a high performance effect can be provided to the operator.

4. Configuration of Light Performance Unit 22

Figure 10:
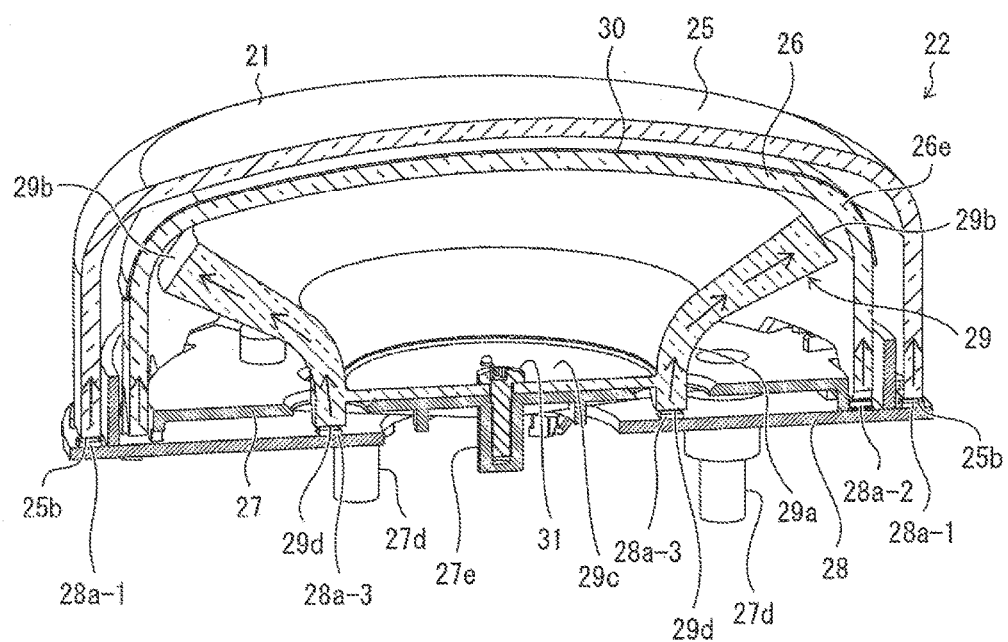
FIG. 10 is a cross-sectional perspective view of a light performance unit equipped on the above push button device.
Figure 11A:
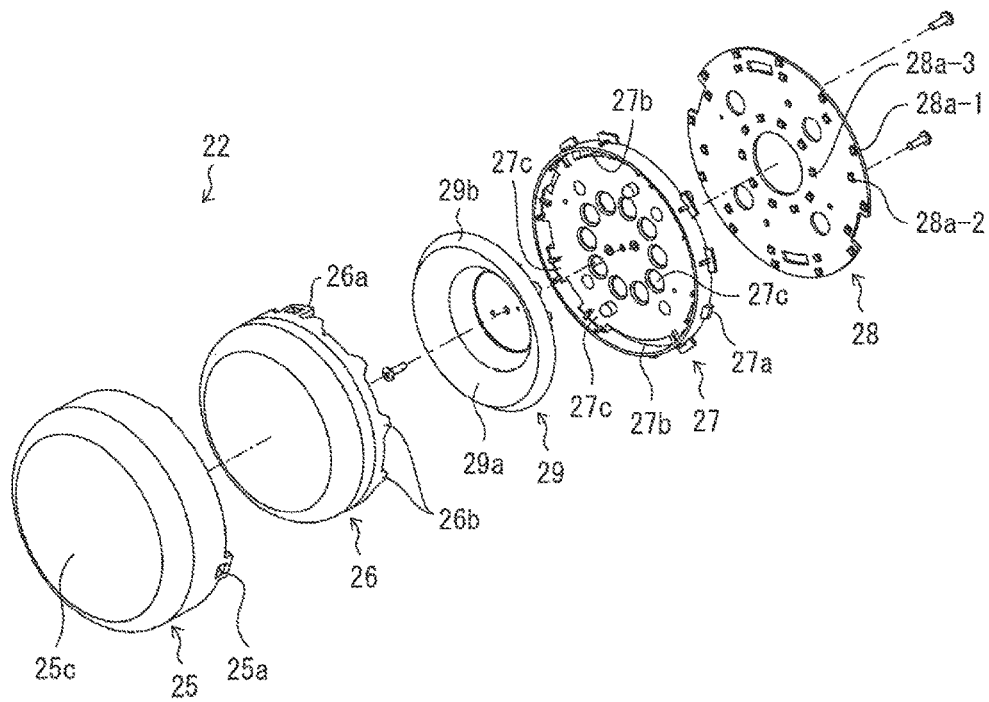
FIGS. 11A and 11B are exploded perspective views each showing a configuration of the above light performance unit, where
Figure 11B:
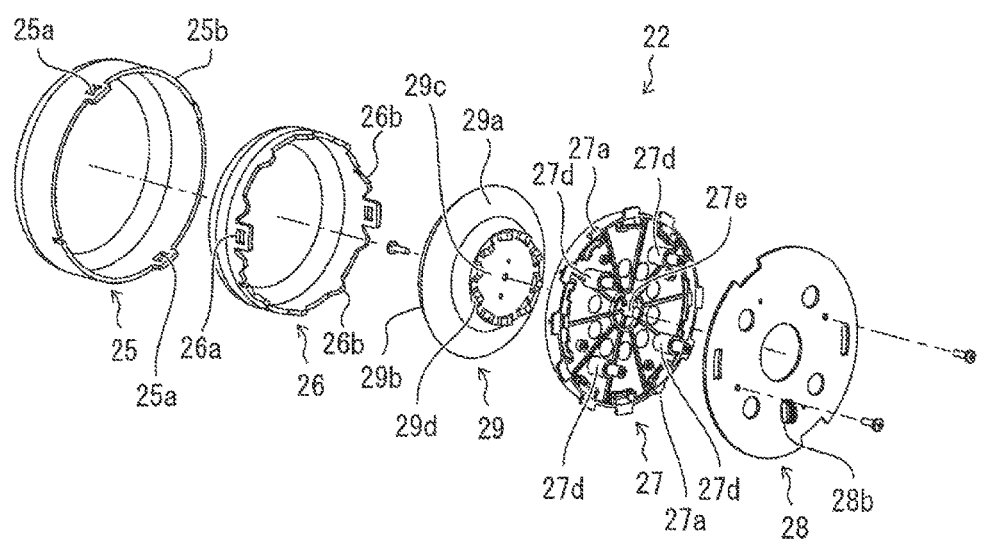
Figure 12:
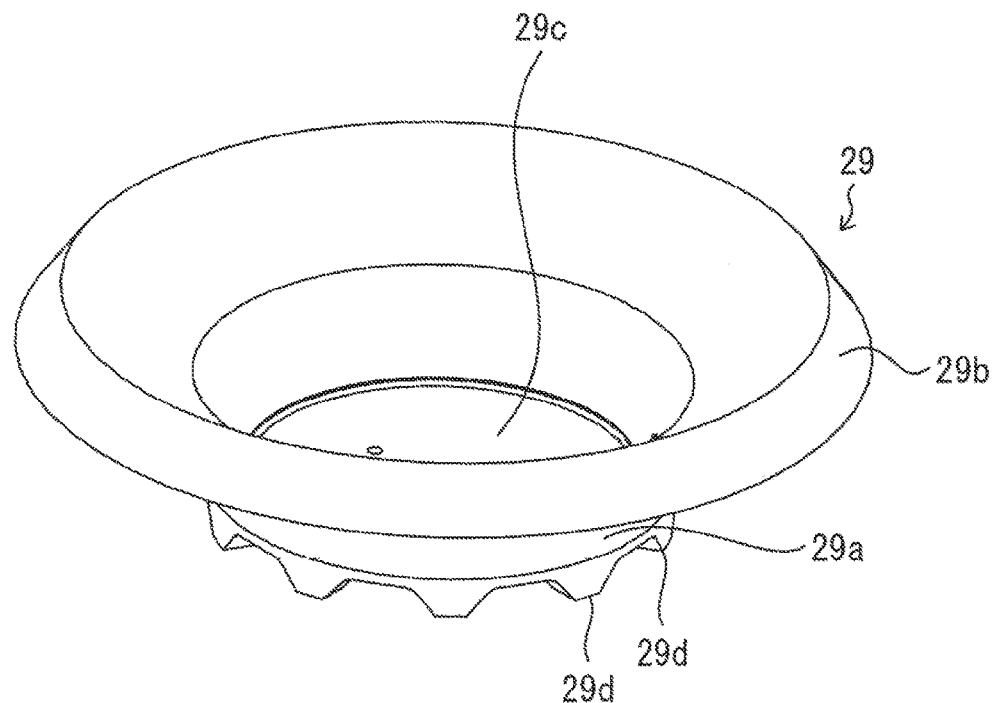
FIG. 12 is a perspective view of a guide lens equipped on the above light performance unit.
Figure 13:
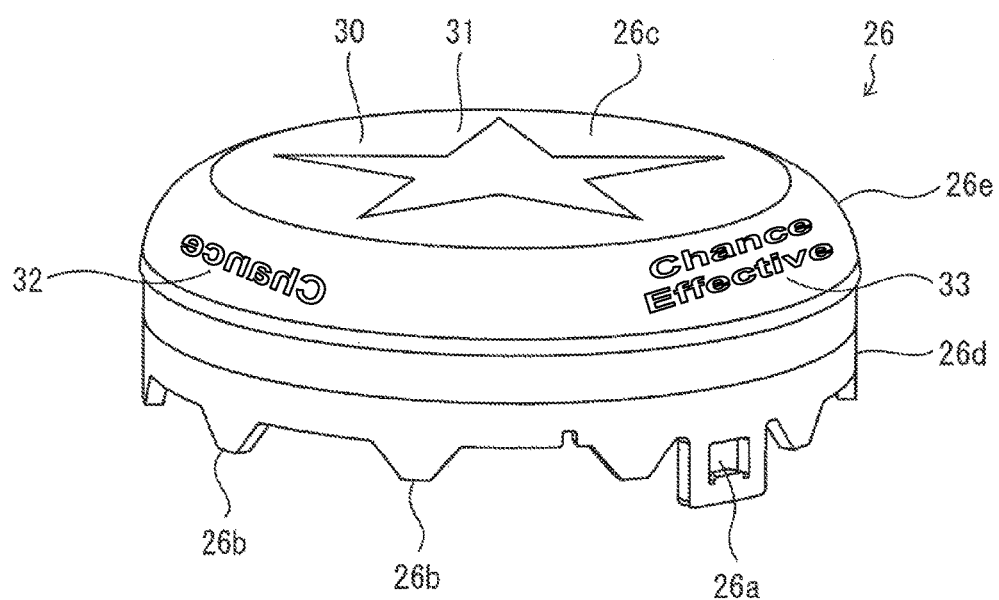
FIG. 13 is a perspective view of an inside lens which is equipped on the above light performance unit and with which a printed sheet is integrally formed.

Next, the configuration of the light performance unit 22 is described with reference to FIG. 10 to FIG. 13. FIG. 10 shows a cross-sectional perspective view of the light performance unit 22 equipped on the push button device 1 and shows the cross-section along the operation direction (vertical direction) of the push button device 1. FIGS. 11A and 11B are exploded perspective views of a configuration of the light performance unit 22. FIG. 11A is an exploded perspective view viewed from above. FIG. 11B is an exploded perspective view viewed from below. FIG. 12 is a perspective view of a guide lens 29 equipped on the light performance unit 22. FIG. 13 is a perspective view of an inside lens 26 which is equipped on the light performance unit 22 and with which a printed sheet 30 is integrally formed.

As shown in FIG. 10 and FIGS. 11A and 11B, the light performance unit 22 is equipped with an outside lens 25, the inside lens 26, the guide lens 29, the printed sheet 30, a base member 27, and a circuit board 28.

The circuit board 28 is a printed circuit board and is equipped with full color LED elements 28a arranged on concentric circles having different diameters. Of the full color LED elements 28a, the full color LED elements 28a-1 are a light source which emits light to be introduced into the outside lens 25, and are arranged along the outermost circle. The full color LED elements 28a-2 are a light source which emits light to be introduced into the inside lens 26, and are arranged along the second circle, which is on the inner side of the outermost circle. The full color LED elements 28a-3 are a light source which emits light to be introduced into the guide lens 29, and are arranged along the innermost circle.

The connector 28b is provided on the surface opposite to the surface on which the full color LED elements 28a are mounted. The circuit board 28 is connected, through the connector 28b, to a controller (not shown) of the pachinko machine 100 equipped with the push button device 1 and causes the full color LED elements 28a to emit light on the basis of a signal from the controller.

The base member 27 is a member to support the respective parts of the light performance unit 22. The circuit board 28 is fixed, with bolts or the like, on the lower side of the bottom part of the base member 27. On the base member 27 are formed outer periphery engagement claws 27a, inner periphery engagement claws 27b, holes 27c, the projecting portions 27d, and a light guide lens securing part 27e. Each of the outer periphery engagement claws 27a is formed at each of two positions on the lower outer circumference of the base member 27. Further, each of the inner periphery engagement claws 27b is formed at each of two positions on the lower inner periphery of the base member 27. The light guide lens securing part 27e is protrudingly formed on the bottom surface of the base member 27.

The holes 27c are formed in the bottom part of the base member 27 at the positions corresponding to the full color LED elements 28a-3 and the full color LED elements 28a-3 on the circuit board 28 when the circuit board 28 is fixed on the base member 27.

The projecting portions 27d are provided to fix the base member 27 to the case 6 (see FIG. 4) and has a cylindrical shape protruding in the downward direction. In the circuit board 28, the upper guide 23, and the lower guide 3, there are formed holes at the positions corresponding to the projecting portions 27d; therefore, the projecting portions 27d are inserted through the holes and are in contact with the case 6. The base member 27 is fixed on the case 6 by fixing the projecting portions 27d and the case 6 to each other with bolts or the like.

The guide lens 29 is configured with a light guide, and light introduced through one end is propagated in the light guide and is emitted through the other end. As shown in FIG. 12, the guide lens 29 has a trunk part 29a in a funnel shape in which the upper part (the inside lens 26 side) is wider than the lower part (the base member 27 side), and has a light emission surface 29b formed at the upper edge of the trunk part 29a. The light emission surface 29b is inclined to be lower on the outer circumference side than on the inner periphery side. This arrangement makes the light emitted from the light emission surface 29b progress in the obliquely upward direction which is the normal direction of the light emission surface 29b.

The above guide lens 29 is fixed on the base member 27 such that the guide lens 29 is fixed on the light guide lens securing part 27e of the base member 27 with bolts or the like, with a bottom part 29c of the guide lens 29 being in contact with the central part of the bottom part of the base member 27. The guide lens 29 has a plurality of projections 29d formed on the lower side of the bottom part 29c of the guide lens 29 so as to surround the outer circumference of the bottom part 29c. The projections 29d pass through the holes 27c and face the full color LED elements 28a-3 on the innermost periphery while the guide lens 29 is fixed on the base member 27 side. Through the projections 29d, the light from the full color LED elements 28a-3 is introduced into the guide lens 29, is propagated in the guide lens 29, and is emitted through the light emission surface 29b.

Referring back to FIG. 10, FIG. 11A, and FIG. 11B, the inside lens 26 is configured with an inverted cup-shaped light guide and is disposed above the base member 27 so as to cover the guide lens 29. In the inside lens 26 are formed engagement holes 26a such that each of the engagement holes 26a is located at the position corresponding to each of the inner periphery engagement claws 27b of the base member 27. The inside lens 26 is fixed on the base member 27 with the engagement holes 26a being engaged with the inner periphery engagement claws 27b of the base member 27.

As shown in FIG. 13, the inside lens 26 is formed integrally with the printed sheet 30 holding a decoration image 31. On the lower end (lower edge) of the inside lens 26, there are formed a plurality of projections 26b such that the projections 26b pass through the holes 27c and face the second round full color LED elements 28a-2 with the inside lens 26 being fixed on the base member 27 side. The projections 26b introduce the light from the full color LED elements 28a-2 into the inside lens 26 to display the decoration image 31 held on the printed sheet 30.

The printed sheet 30 holds the decoration image 31 in the area corresponding to an upper surface 26c of the inside lens 26, and the printed sheet 30 also has a projection image 32 for the first image and second images 33 on a rounded curve part 26e ranging from the upper surface 26c of the inside lens 26 to a trunk part 26d.

As described above, the decoration image 31 is an image to be displayed on the upper surface 26c of the inside lens 26 so as to be directly viewed by a player. The decoration image 31 is displayed when the light from the full color LED elements 28a-2 is introduced into the inside lens 26 and when the inside lens 26 wholly emits light.

The projection image 32 for the first image is an image for projecting, by the light emitted from the guide lens 29, the first image which is reflected by the glass plate 103 and is viewed by a player. The second images 33 are images to be directly viewed by a player and are formed by the light emitted from the guide lens 29.

The decoration image 31, the projection image 32, and the second images are printed on the printed sheet 30 in the embodiment. Different from the decoration image 31 and the second images which are directly viewed, the projection image 32 is reflected by the glass plate 103 and is viewed. Therefore, only the projection image 32 is a mirror image in which the first image is laterally reversed, and if the first image is characters, the first image is mirror characters, and if the first image is a pattern, the first image is a mirrored pattern. The projection image 32 is formed at the position facing the glass plate 103 side when the push button device 1 is mounted on the pachinko machine 100. In order to make the characters and the pattern of the first image more noticeable, it is preferable that the characters and the pattern be made in a form of so-called open-face font, in which the characters and the pattern are made transparent and the surrounding area of the characters and the pattern are made opaque. In FIG. 13, the first image is the letters of "Chance", and the projection image 32, which are the mirror characters for the letters "Chance", are shown as an example.

A projection unit is configured as follows. The projection unit radiates light in the direction of the game board 101 by using the inside lens 26 with which the printed sheet 30 is integrally formed, using the guide lens 29, and using the full color LED elements 28a-3 on the innermost periphery so as to project the first image in an area in a field of view of a player viewing the game board 101. More specifically, the projection unit is configured such that the light is radiated toward the glass plate 103 and is reflected by the glass plate 103 so that the first image is projected to be viewed by a player.

The second images 33 can be formed at any positions except the position which faces, when the push button device 1 is mounted on the pachinko machine 100, the glass plate 103 side and at which the projection image 32 is formed. In order to make the characters and the pattern more noticeable, similarly to the projection image 32, it is also preferable that the displayed characters and pattern be made in a form of so-called open-face font, in which the characters and the pattern are made transparent and the surrounding area of the characters and the pattern is made opaque. FIG. 13 shows the letters "Chance Effective" as an example of the second images 33. In the embodiment, three images are held as the second images 33, and each of the three images is directed to the player of the pachinko machine 100, and the right and left of the pachinko machine 100.

Further, in the push button device 1 according to the embodiment, as a more preferable configuration, processing such as halftone printing is performed on the projection image 32 and the second images 33 to make the projection image 32 and the second images 33 less visible in the light other than the light from the guide lens 29.

Examples of the method for manufacturing the inside lens 26 with which the printed sheet 30 is integrally formed include a method, in which the inside lens 26 is manufactured by an insert molding process with the printed sheet 30 being disposed in a molding die, where the printed sheet 30 has thereon the decoration image 31, the projection image 32, and the second images 33 formed by using a silk-screen printing process.

Referring back to FIG. 10 and FIGS. 11A and 11B, the outside lens 25 is configured with an inverted cup-shaped light guide and is disposed above the base member 27 to cover the inside lens 26. The outside lens 25 has a light diffusion pattern having fine concavities and convexities formed on one or both of a front surface and a rear surface of an upper surface 25c to display an image for performance (not shown) directed to a player. The outside lens 25 has engagement holes 25a formed at the positions corresponding to the outer periphery engagement claws 27a of the base member 27. The outside lens 25 is fixed on the base member 27 with the engagement holes 25a being engaged with the outer periphery engagement claws 27a of the base member 27.

The outside lens 25 is located on the outside of a vertical wall of the base member 27 while being fixed on the base member 27, and a lower end 25b of the outside lens 25 faces the full color LED elements 28a-1 on the outermost periphery of the circuit board 28. The light from the full color LED elements 28a-1 is introduced into the outside lens 25 through the lower end 25b and is emitted through the light diffusion pattern to display an image for performance which is viewed by a player. Note that a principle how the image for performance formed by the light diffusion pattern can be viewed will be described in a second embodiment.

5. Description of Operation of Light Performance Unit 22

Figure 14A:
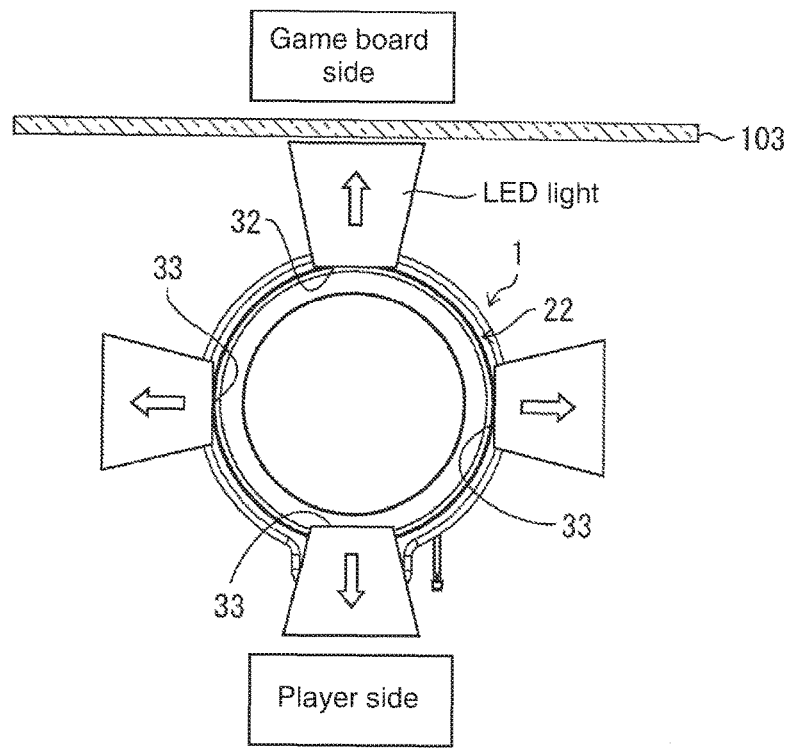
FIGS. 14A and 14B are explanatory diagrams each showing an operation of performance executed by the push button device equipped with the above light performance unit, where
Figure 14B:
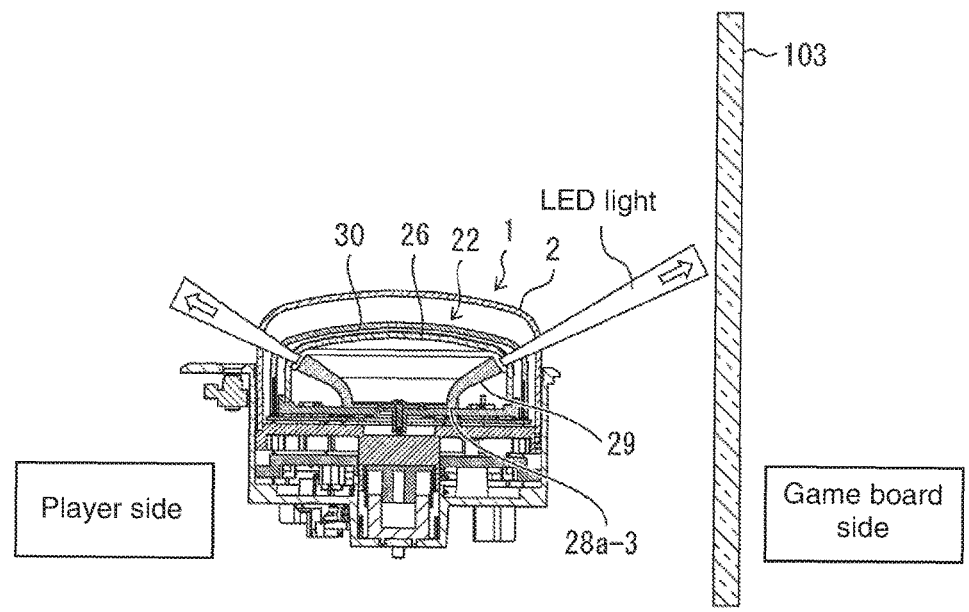
Figure 15:
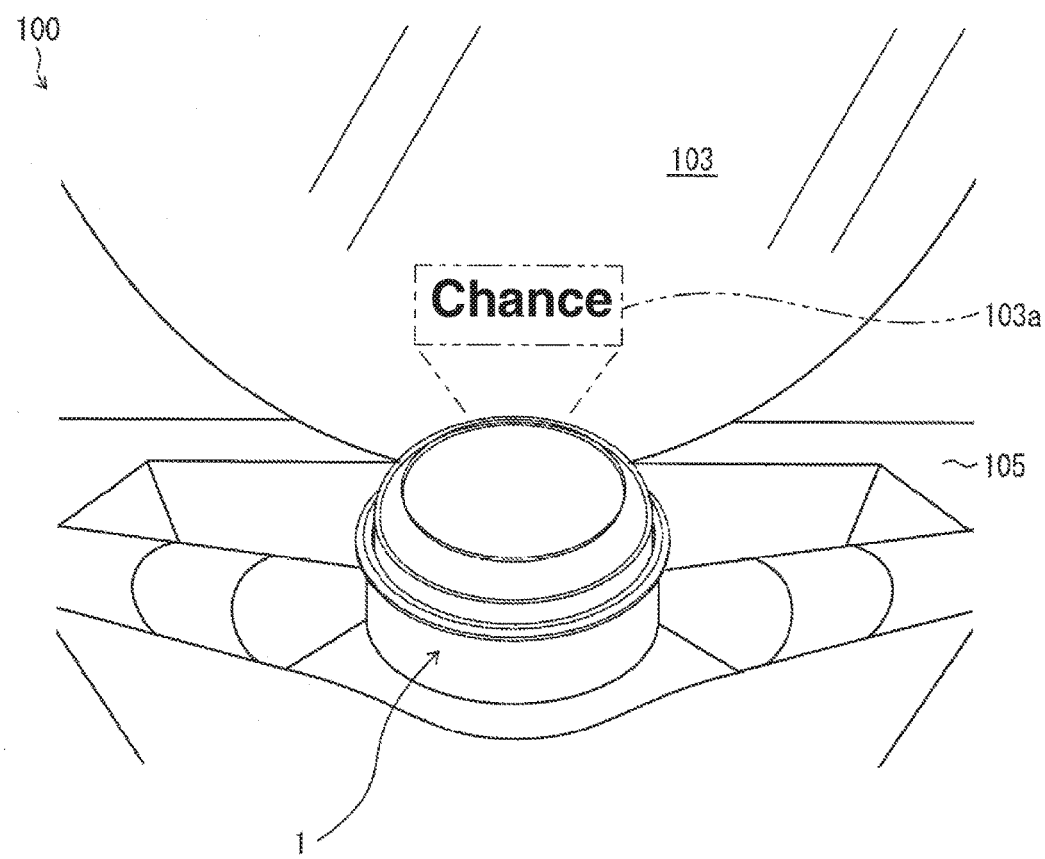
FIG. 15 is a main part enlarged view of a part of the above pachinko machine on which a first image is reflected.

Next, an operation of the light performance unit 22 is described with reference to FIG. 10, FIG. 13, FIGS. 14A and 14B, and, FIG. 15. FIGS. 14A and 14B are explanatory diagrams each showing an operation of performance by the push button device 1 equipped with the light performance unit 22. FIG. 14A shows the push button device 1 viewed from above. FIG. 14B shows the push button device 1 viewed from the side. FIG. 15 is a main part enlarged view of a part of the pachinko machine 100 on which the first image is reflected.

As shown in FIG. 10, when the full color LED elements 28a-3 on the innermost periphery of the circuit board 28 is turned on, the light of the full color LED elements 28a-3 is introduced into the guide lens 29 of the light performance unit 22, is propagated in the guide lens 29, and is emitted through the light emission surface 29b in the obliquely upward direction. The emitted light passes through the projection image 32 and the second images 33 (see FIG. 13) held on the printed sheet 30 on the rounded curve part 26e of the inside lens 26.

As shown in FIGS. 14A and 14B, the emitted light (LED light) for forming the first image passes through the projection image 32, is radiated toward the glass plate 103, and is reflected at the area 103a of the glass plate 103, whereby the first image can be viewed as shown in FIG. 15. The area 103a is preferably located in the vicinity of a start port (not shown) or a prize port (not shown) in the game area. This area can be quickly recognized by a player and is a darker area than the area in front of the display screen 106, so that the first image is easily recognized.

Further, as shown in FIGS. 14A and 14B, the emitted light (LED light) having passed through the second images 33 enables each of the player of the pachinko machine 100 and other players on the right and left of the pachinko machine 100 to directly view the corresponding second image 33.

6. Effect Due to Configuration

As described above, the push button device 1 according to the embodiment is equipped with the light performance unit 22 and emits light from the light performance unit 22 to the glass plate 103 covering the game board 101, where the emitted light is reflected by the glass plate 103 to form the first image which is viewed by a player.

With this arrangement, even if the push button device 1 is disposed at the position which is below the game board 101 and which cannot be easily noticed by the player gazing at the game board 101, the light performance of the push button device 1 comes into the field of view of the player gazing at the game board 101, whereby impressive performance can be achieved.

Further, it is possible to make noticeable the existence of the push button device 1 as a radiation source of the light to form the first image. Therefore, it is possible to cause the player to notice the push button device 1 and to naturally prompt the user to operate without taking a measure such as displaying, on the display screen 106 provided on the game board 101, an image which prompts the user to operate the main body 2.

In this case, for example, by displaying as the first image an image which prompts to operate the main body 2, an operation of the main body 2 can be more surely prompted. Further, it is not necessary to take a measure such as displaying, on the display screen 106 provided on the game board 101, an image to prompt to operate the main body 2. Therefore, the display screen 106 can be used for other performances, whereby it is possible to broaden the variety of performances on the pachinko machine 100 on which the main body 2 is mounted.

Further, by changing the projection image 32 held on the printed sheet 30, the first image to be displayed on the transparent plate is easily changed; therefore, a common configuration is used between different types of game machines to reduce cost, and at the same time, performances can be executed depending on the respective game machines.

When the pachinko machine 100 is installed under an environment where an illumination device is turned on, the light radiated from the light performance unit 22 to form the first image needs to be high in intensity to a certain extent so that the first image can be reflected by the glass plate 103 and be viewed. In the light performance unit 22, the guide lens 29 is used to realize light having a high intensity to a certain extent.

In the push button device 1 according to the embodiment, the printed sheet 30 holds not only the projection image 32 but also the second images 33, which are directly viewed by a player in front of the pachinko machine 100 and other players on the right and left of the pachinko machine 100, and the second images 33 are displayed by using relatively intense light emitted from the guide lens 29.

The second images 33 are displayed by using relatively intense light emitted from the guide lens 29 and is shining more intensely than the decoration image 31 displayed with the light guided by the inside lens 26. Therefore, even if the second images 33 are displayed together with the decoration image 31, the second images 33 can be visually recognized, whereby the performance can be more impressive.

In the case of the configuration using the guide lens 29, if the light emission surface 29b extending in a belt shape is made to have a large width by forming one end side, of the guide lens 29, having thereon the light emission surface 29b to be thick, it is possible to enlarge the first image which is reflected by the glass plate 103 and is viewed.

By the way, when the light from the full color LED elements 28a-2 of the circuit board 28 is introduced into the inside lens 26 to display the decoration image 31, the projection image 32 and the second images 33 are also viewed in some cases. In addition, even if the light is not introduced into the inside lens 26, the projection image 32 and the second images 33 can be viewed by external light such as light from illumination devices in the game parlor. In such a case, the performance effect of the display, of the first image and the second images 33, performed by making the guide lens 29 emit light is decreased.

To address this issue, in the push button device 1 according to the embodiment, as a more preferably configuration, processing such as halftone printing is performed on the projection image 32 and the second images 33 to reduce the visibility due to the light other than the irradiation light from the guide lens 29. This arrangement can prevent the decrease in the effect of the performance, of the first image and the second images 33, by the light from the guide lens 29.

In the push button device 1 according to the embodiment, there is described as an example the configuration in which the main body 2 has a circular shape when viewed from the upward direction. However, the shape of the main body may have other shapes such as a rectangular shape when viewed from the upward direction. When the main body 2 has a rectangular shape, it is preferable that the light emission surfaces and the like of the outside lens, the inside lens, and guide lens also have rectangular shapes; and the guide lens, the inside lens, and the outside lens in rectangular shapes are also within the scope of the present invention.

In the push button device 1 according to the embodiment, the guide lens 29 is made in a funnel shape, and the light emission surface 29b is made in an annular shape. However, in a configuration in which only the first image is viewed, the guide lens 29 may be cut into quarters to use one of the quarters as the guide lens 29, and the one of the quarters may be disposed such that the light emission surface 29b is made to face the glass plate 103.

Second Embodiment

Another embodiment of the present invention will be described. Note that, in the embodiment, the differences from the first embodiment are described.

The push button device 1 according to the embodiment is equipped with a light performance unit 22A instead of the light performance unit 22. At this point, the push button device 1 according to the embodiment is different from the push button device 1 according to the first embodiment.

Figure 16:
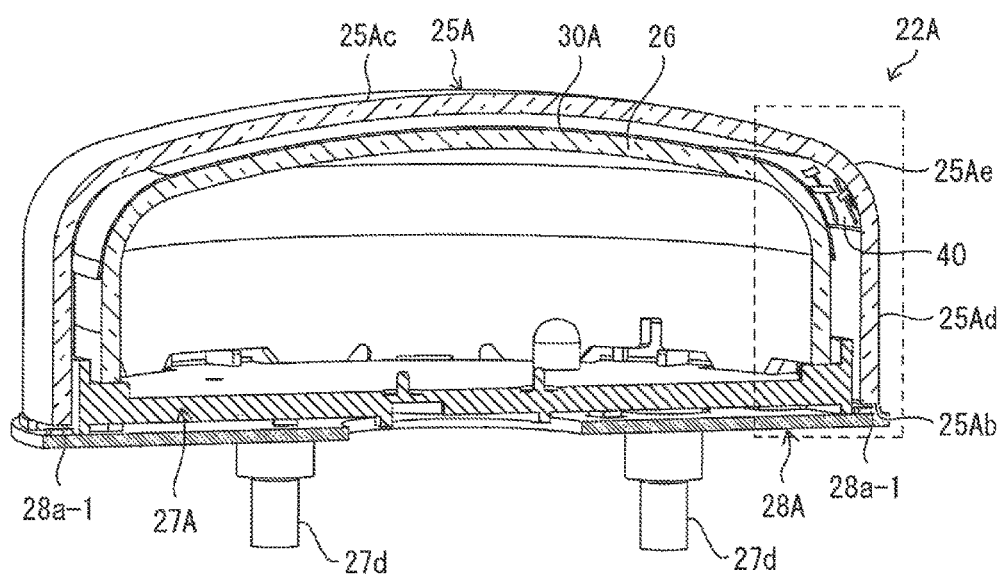
FIG. 16 is a cross-sectional perspective view of a light performance unit equipped on a push button device according to another embodiment of the present invention.
Figure 17:
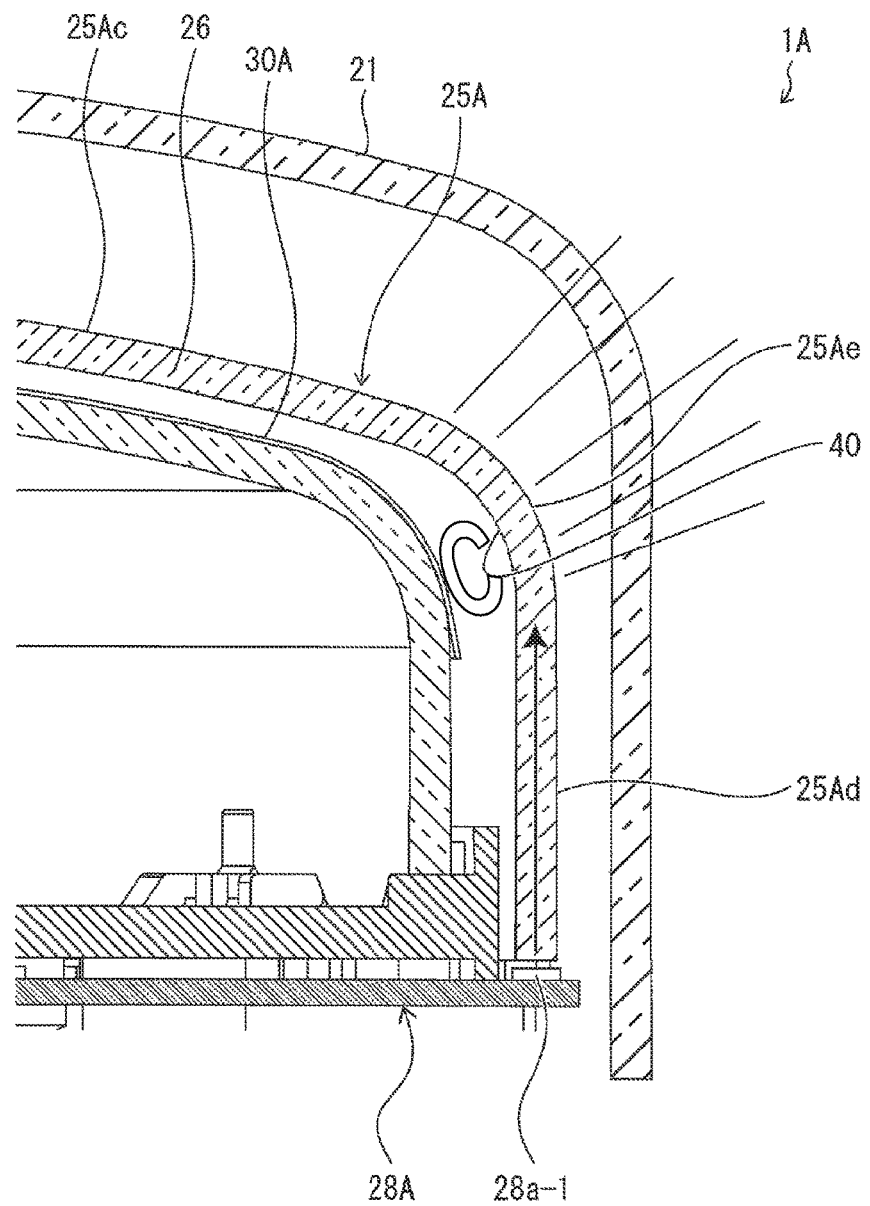
FIG. 17 is a main part enlarged view in which the part surrounded by the broken line in FIG. 16 is enlarged and shown.
Figure 18A:
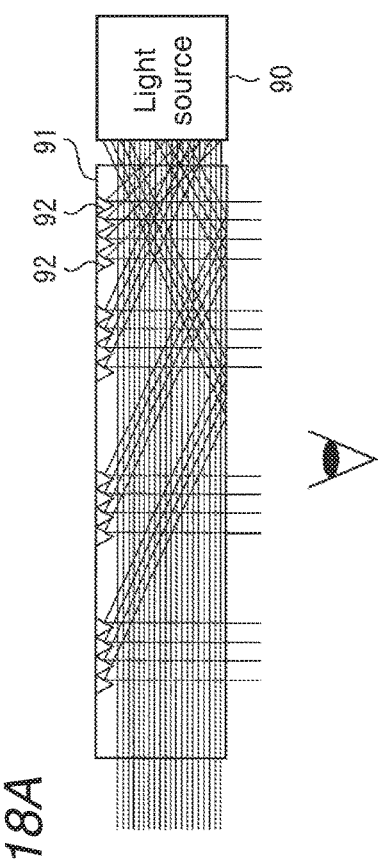
FIGS. 18A to 18C are diagrams each illustrating a light diffusion pattern formed on an outside lens equipped on the above light performance unit, where
Figure 18C:
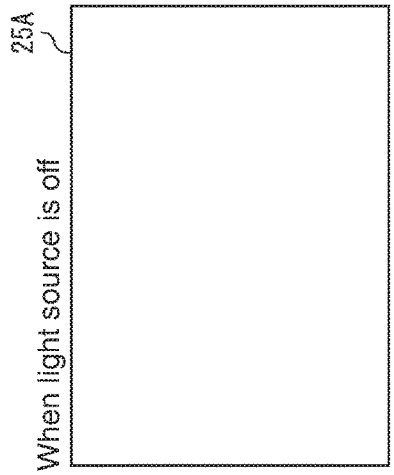
Figure 18B:
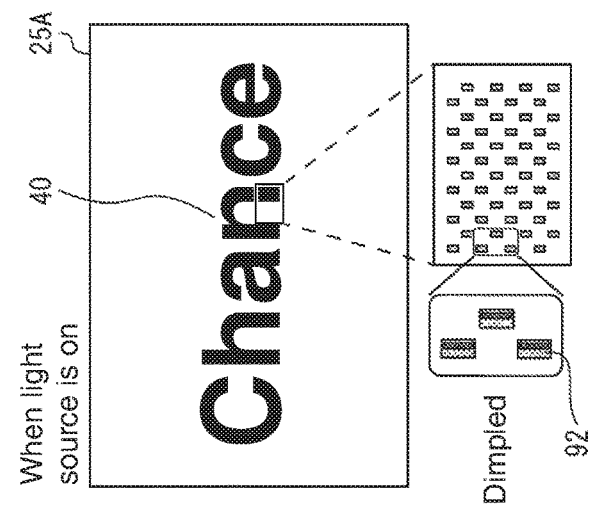

FIG. 16 is a cross-sectional perspective view of the light performance unit 22A equipped on the push button device 1 and shows the cross-section along an operation direction (vertical direction) of the push button device 1. FIG. 17 is a main part enlarged view in which the part surrounded by the broken line in FIG. 16 is enlarged and shown. However, FIG. 17 shows the cross-section at an angle slightly different from that in FIG. 16 and includes the cover 21. FIGS. 18A to 18C are diagrams each illustrating a light diffusion pattern formed on an outside lens 25A. FIG. 18A shows a principle how light is emitted from the light diffusion pattern. FIG. 18B shows the appearance when a light source is on. FIG. 18C shows the appearance when the light source is off.

As shown in FIG. 16, the light performance unit 22A is not equipped with the guide lens 29. Accordingly, instead of the circuit board 28, there is equipped with a circuit board 28A which is not provided with the full color LED elements 28a-3, on the innermost periphery, corresponding to the guide lens 29; and, instead of the base member 27, there is equipped with a base member 27A which does not have the holes 27c formed corresponding to the full color LED elements 28a-3 on the innermost periphery.

Further, the light performance unit 22A has, instead of the printed sheet 30, a printed sheet 30A formed integrally with the inside lens 26 and is equipped with, instead of the outside lens 25, the outside lens (light guide, lens member) 25A. The difference between the printed sheet 30A and the printed sheet 30 is that the printed sheet 30A does not hold the projection image 32 for the first image and the second images 33.

The difference between the outside lens (light guide, lens member) 25A and the outside lens 25 is as follows. The light diffusion pattern 40 for emitting the light to form the first image is formed in the same method as the image for performance (not shown) on one or both of the front surface and the rear surface of a rounded part 25Ae. The rounded part 25Ae ranges from an upper surface 25Ac to a trunk part 25Ad of the outside lens 25A. The outside lens 25A is disposed such that the part having the light diffusion pattern 40 formed thereon is directed to the glass plate 103 (see FIG. 1) when the push button device 1 is mounted on the pachinko machine 100.

In the configuration described above, the light from the full color LED elements 28a-1 is introduced into the outside lens 25A through a lower end 25Ab, is emitted through the light diffusion pattern 40, is radiated toward the glass plate 103, and is reflected by the glass plate 103, thereby forming the first image which can be viewed by a player.

As shown in FIG. 18A, the light is emitted from a light source 90 (corresponding to the full color LED elements 28a-1), is introduced into the inside of a light guide 91 (corresponding to the outside lens 25A) through one end side of the light guide 91, is propagated to the other end side while being totally reflected in the light guide 91, and is emitted from the other end side. While being propagated, the light receives action from a light diffusion pattern configured with fine concavities and convexities (dimpled) 92 which are formed on the surface of the light guide 91, and light which does not satisfy a total reflection condition is emitted through the surface of the light guide 91. Regarding an image for performance (not shown), the light emitted from the light diffusion pattern is directly viewed. Regarding a first image, the light emitted from the light diffusion pattern and reflected by the glass plate 103 is viewed.

With reference to FIG. 18A, the light diffusion pattern is formed on a rear surface opposite to the front surface. Through the front surface, the light which does not satisfy the total reflection condition of the light guide 91 is emitted. However, the light diffusion pattern may be provided on the front surface or may be provided on both of the front surface and the rear surface. The light diffusion pattern 40 for the first image to be reflected and displayed must be reversed front and back with respect to the light diffusion pattern for the image for performance which is directly viewed. That is to say, if a diffusion pattern is formed on the front surface, the light diffusion pattern for the image for performance is the same as the image for performance when viewed from the front surface; however, the light diffusion pattern for the first image needs to be a mirror image. To the contrary, if a light diffusion pattern is formed on the rear surface, the light diffusion pattern for the first image is the same as the first image when viewed from the rear surface; however, the light diffusion pattern for the image for performance needs to be a mirror image.

As shown in FIG. 18B, when the light source (the full color LED elements 28a-1) is on, light is emitted from the light diffusion pattern 40; and as shown in FIG. 18C, when the light source (the full color LED elements 28a-1) is off, light is not emitted from the light diffusion pattern 40, and the light diffusion pattern 40 cannot be viewed.

Referring back to FIG. 17, as shown in FIG. 17, in the light performance unit 22A configured as described above, when the full color LED elements 28a-1 (the first light source, the second light source) on the outermost periphery on the circuit board 28 are turned on, the light from the full color LED elements 28a-1 is introduced into the outside lens 25A of the light performance unit 22A, is propagated in the outside lens 25A, and is emitted obliquely upward from the light diffusion pattern 40 in the course of being propagated.

A projection unit projects the first image on the area in the field of view of a player watching the game board 101 by radiating light toward the game board 101 by using the outside lens 25A and the full color LED elements 28a-1 on the outermost periphery. More specifically, the projection unit radiates the light toward the glass plate 103 to project the first image which is reflected by the glass plate 103 and is viewed by a player.

Figure 19A:
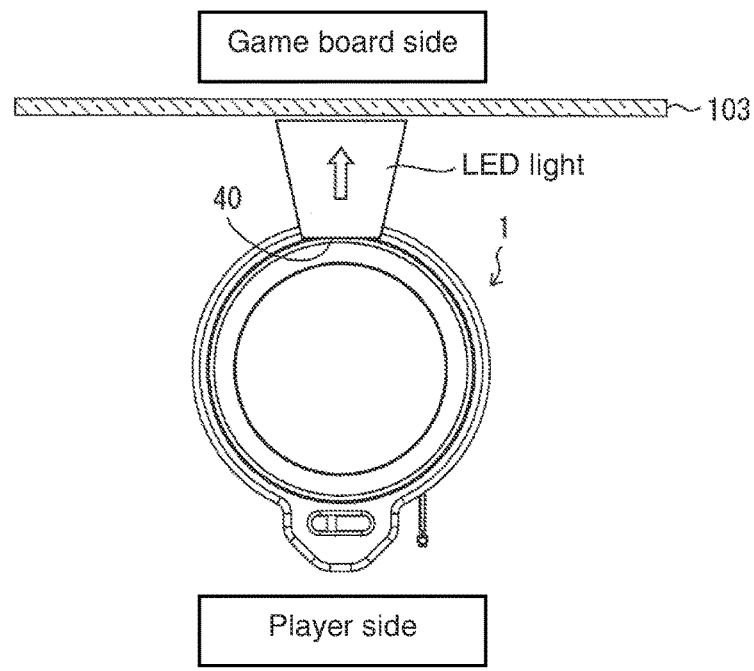
FIGS. 19A and 19B are explanatory diagrams each showing an operation of performance by the push button device equipped with the above light performance unit, where
Figure 19B:
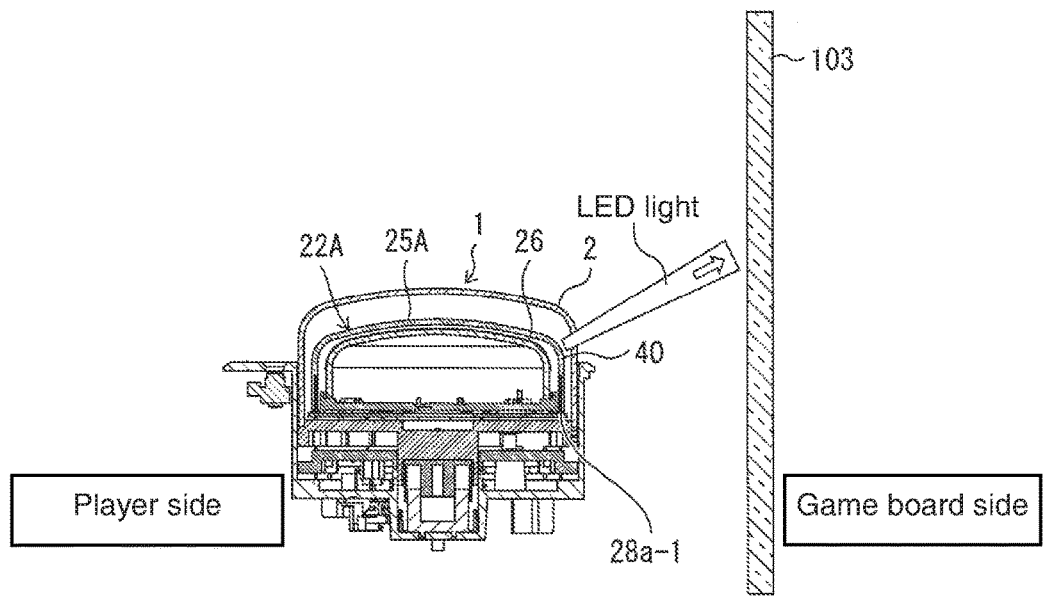

FIGS. 19A and 19B are explanatory diagrams each showing an operation of performance by the push button device 1 equipped with the light performance unit 22A. FIG. 19A shows the push button device 1 viewed from above. FIG. 19B shows the push button device 1 viewed from the side.

As shown in FIGS. 19A and 19B, the emitted light (LED light) is emitted from the light diffusion pattern 40 to form the first image and is radiated toward the glass plate 103. The light radiated toward the glass plate 103 is reflected by the area 103a of the glass plate 103, and the first image can be viewed.

Regarding the light performance unit 22A of FIG. 16, a configuration is exemplified in which only the light diffusion pattern 40 for emitting the light to form the first image is provided on the rounded part 25Ae of the outside lens 25A. However, it is possible to provide a light diffusion pattern for displaying the second image which is directly viewed by a player. The light diffusion pattern for displaying the second image, which is directly viewed by a player, may be formed in the same way as the light diffusion pattern for the image for performance (not shown) formed on the upper surface 25Ac of the outside lens 25A.

Figure 20:
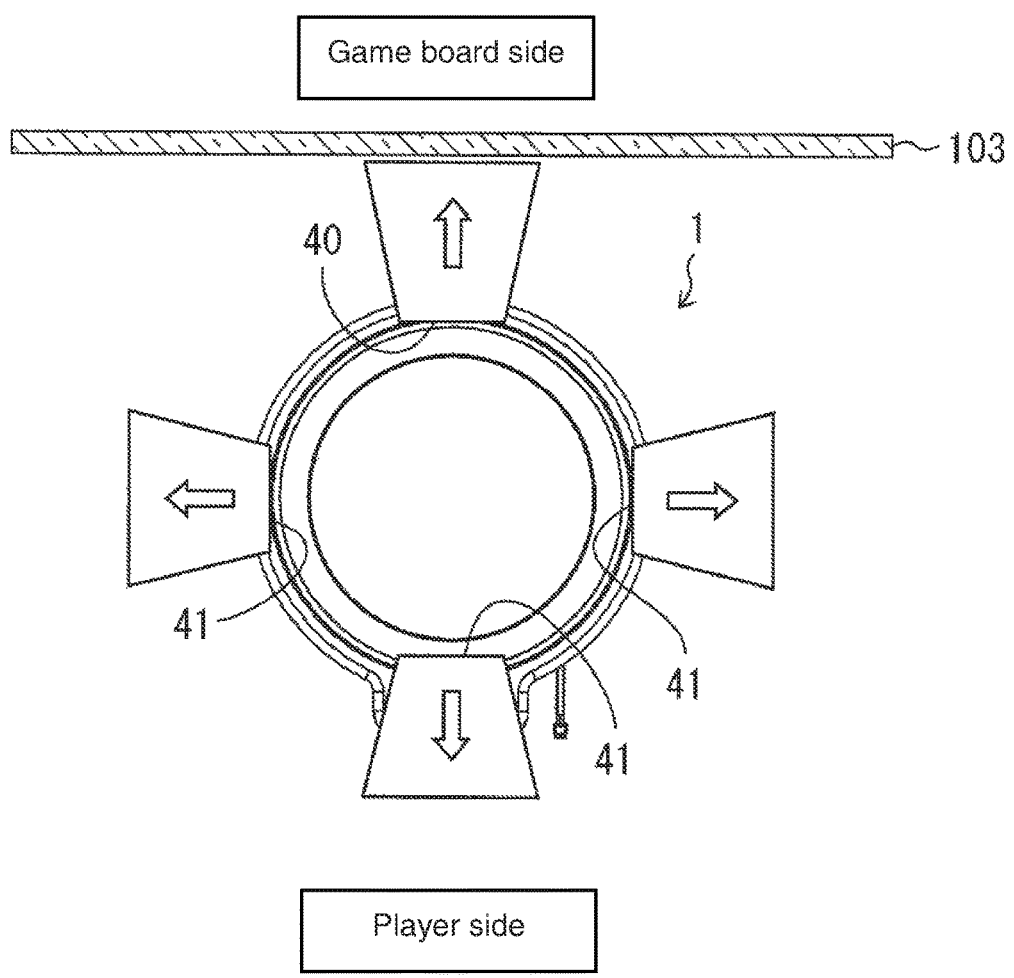
FIG. 20 is an explanatory diagram showing an operation of performance by a modified example of the above light performance unit, and showing the push button device viewed from above.

FIG. 20 is an explanatory diagram showing an operation of performance by the light performance unit 22A of a modified example and shows the push button device 1 viewed from the upward direction. The light performance unit 22A has, on the rounded part 25Ae of the outside lens 25A: the light diffusion pattern 40 to emit the light to form the first image; and the light diffusion patterns 41 to display the second images, which are directly viewed by a player.

As shown in FIG. 20, the emitted light (LED light) is emitted by the light diffusion patterns 41 in addition to the emitted light (LED light) which is emitted by the light diffusion pattern 40 to form the first image. Each of the player of the pachinko machine 100 and other players on the right and left of the pachinko machine 100 can directly view the second image formed by the corresponding light diffusion pattern 41.

In the configuration in which the first image is displayed by using the outside lens 25A, the curvature of the rounded part 25Ae of the outside lens 25A can be changed to change the position of the first image which is reflected by the glass plate 103 and is viewed.

Although the outside lens 25A has the rounded part 25Ae in the embodiment, the outside lens may have a chamfered taper (slope) instead of roundness.

In the above configurations, when the rounded part 25Ae or the tapered part is made wide, it is easier to enlarge the first image, which is reflected by the glass plate 103 and is viewed, than using the guide lens 29 which requires thick-wall molding.

Third Embodiment

Another embodiment of the present invention will be described. Note that, in the embodiment, the differences from the first embodiment and the second embodiment are described.

A push button device 1 according to the embodiment is equipped with a light performance unit 22B instead of the light performance unit 22. At this point, the push button device 1 according to the embodiment is different from the push button device 1 according to the first embodiment.

Figure 21:
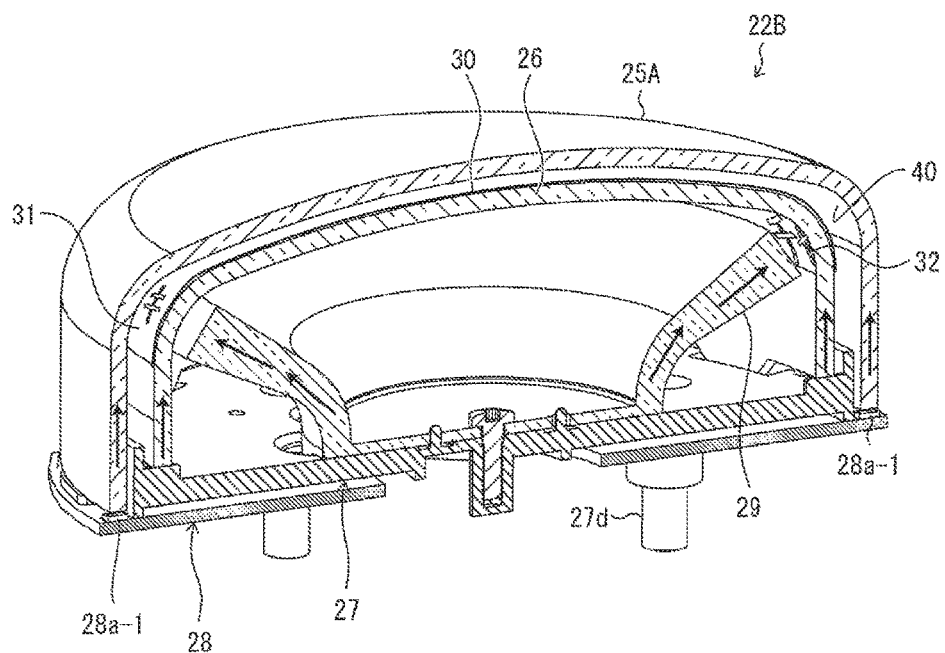
FIG. 21 is a cross-sectional perspective view of a light performance unit equipped on a push button device according to still another embodiment of the present invention.

FIG. 21 is a cross-sectional perspective view of the light performance unit 22B equipped on the push button device 1 and shows a cross-section along the operation direction (vertical direction) of the push button device 1. As shown in FIG. 21, the light performance unit 22B is equipped with the guide lens 29 in the light performance unit 22, an inside lens 26 and an outside lens 25A. The inside lens 26 is formed integrally with a printed sheet 30 holding a projection image 32 for the first image. On the outside lens 25A is formed the light diffusion pattern 40 for the first image in the light performance unit 22A.

Figure 22:
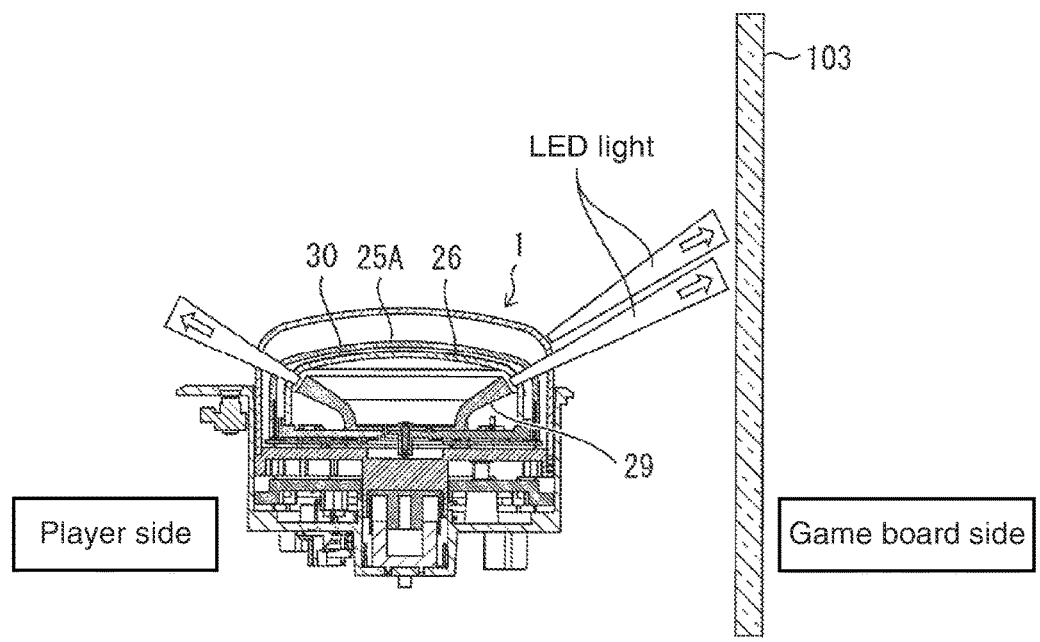
FIG. 22 is an explanatory diagram showing an operation of performance by the push button device equipped with the above light performance unit, and showing the push button device viewed from the side.

FIG. 22 is an explanatory diagram showing an operation of performance of the push button device 1 equipped with the light performance unit 22B and shows the push button device 1 viewed from the side. As shown in FIG. 22, in the above configuration, it is possible to irradiate toward the glass plate 103 both of the emitted light (LED light) emitted from the guide lens 29 and the emitted light (LED light) introduced into the outside lens 25A. The emitted light (LED light) emitted from the guide lens 29 takes in the projection image 32 while passing through the printed sheet 30 so as to form the first image, and the emitted light (LED light) introduced into the outside lens 25A is emitted from the light diffusion pattern 40 to form the first image. With this arrangement, more information can be reflected by the glass plate 103 for a player to view.

In the configuration of FIG. 22, the second images, which are directly viewed by a player, is formed only on the printed sheet 30; however, it is possible to provide other light diffusion patterns for the second images on the outside lens 25A.

In the above configuration, it is possible to turn on, at different timings, the full color LED elements 28a-3 (see FIG. 10) which are on the innermost periphery and functions as the light source for the guide lens 29 and the full color LED elements 28a-1 (see FIG. 21) which are on the outermost periphery and function as the light source for the outside lens 25A; thus, the light performance can be more elaborate, and it is possible to broaden the variety of performances.

Modified Example

A modified example applicable to the above embodiment will be described. As shown in FIG. 15, in the above embodiments, the push button device 1 is mounted on the pachinko machine 100 as a game machine, and the push button device 1 emits light in the direction of the game board 101 so that the first image is reflected at the area 103a of the glass plate 103 and is viewed.

Figure 23:
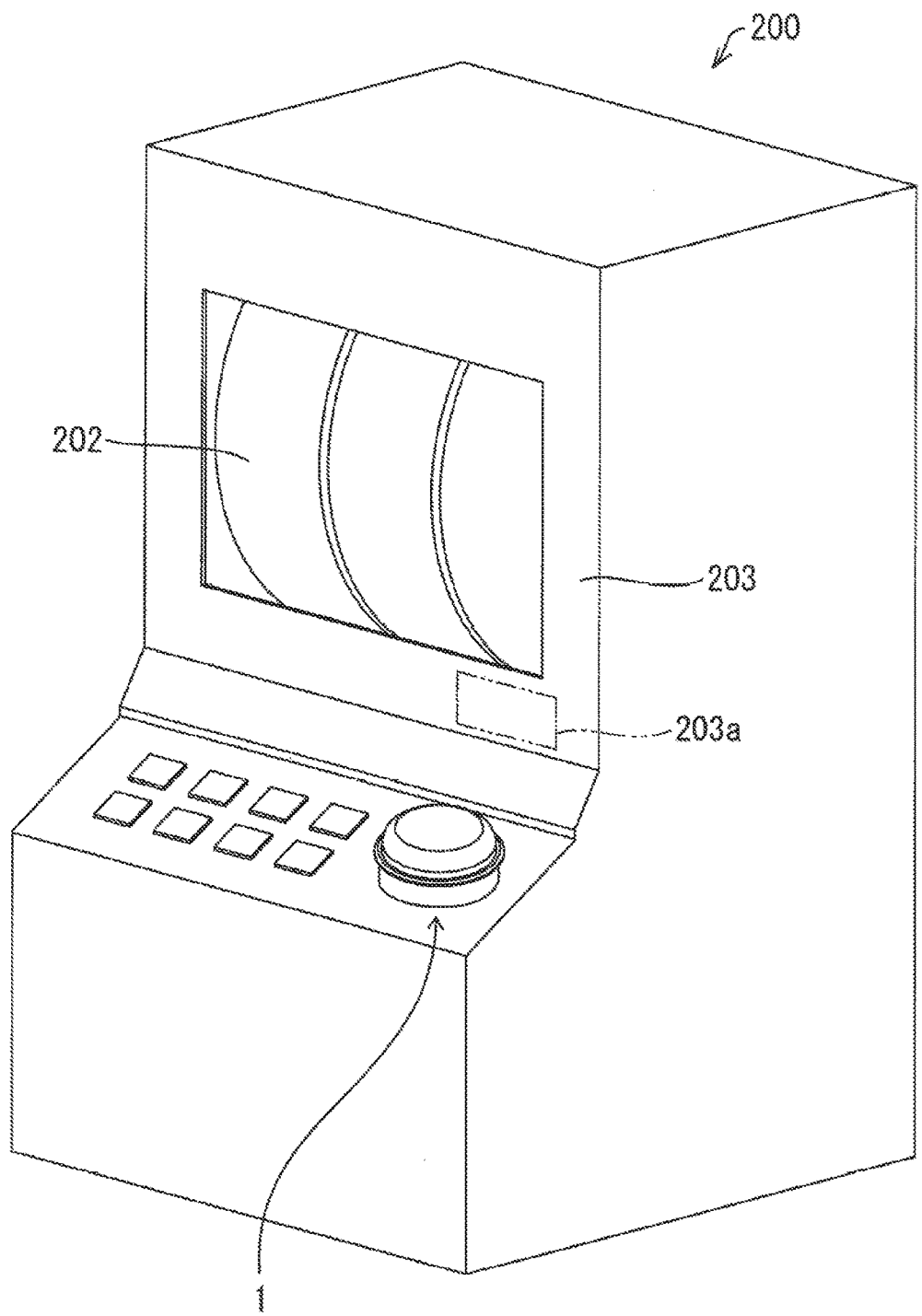
FIG. 23 shows a modified example of embodiments of the present invention and is a schematic front view of a slot machine on which the push button device is mounted.

In contrast, in the configuration of the modified example, as shown in FIG. 23, the push button device 1 is mounted on a slot machine 200 as a game machine, and the push button device 1 radiates light in the direction of the game board 202 so that the first image is projected on an area 203a on a frame member 203 in the surrounding area of the game board 202 and is viewed. However, it is also possible to provide a screen on the frame member 203 covering the surrounding area of the game board 202 to improve the visibility.

The present invention is not limited to the above-described embodiment, and various modifications can be done within the scope of the invention defined by the claims. In addition, an embodiment obtained by combining the technical units disclosed in each of the different embodiments is also included in the technical scope of the present invention.

The invention claimed is:

1. A game machine operating device to be mounted on a game machine equipped with a game board, the game machine operating device being provided in front of the game board and comprising:
    a button receiving an operation, the button comprising:
        a projection unit comprising:
            a first light source radiating light; and
            a light guide including an inner surface and an outer surface, wherein
        the light guide has a light diffusion pattern formed on one or both of the inner surface and the outer surface, the light diffusion pattern to display a first image, and
        a part on which the light diffusion pattern is formed is oriented toward the game board and the light radiated from the first light source is projected through the light diffusion pattern toward the game board such that the first image appears in a visible area for viewing the game board.

2. The game machine operating device according to claim 1, wherein the game machine comprises a transparent plate covering a front side of the game board,
    the projection unit radiates light toward the transparent plate; and
    the projection unit projects the first image onto the transparent plate such that the first image is reflected by a reflective area of the transparent plate and a reflection of the first image appears on the reflective area of the transparent plate.

3. The game machine operating device according to claim 2, wherein the button is moved by a push-in operation, and
    the light guide comprises a cup-shaped lens member comprising: an upper surface having a decorative image; a trunk part having a lower opening end; and an inclined or rounded part that is inclined or rounded from a peripheral edge of the upper surface to the trunk part, the inclined or rounded part comprises the light diffusion pattern of the first image.

4. The game machine operating device according to claim 3, wherein on the inclined or rounded part of the cup-shaped lens member, a light diffusion pattern of a second image is further provided to be oriented toward a side away from the game board.

5. The game machine operating device according to claim 3, further comprising a second light source irradiating light, wherein the second light source is provided such that the light irradiated from the second light source is introduced from an edge of the cup-shaped lens member and guided in the cup-shaped lens member, so that the decorative image appears on the upper surface of the cup-shaped lens member.

6. The game machine operating device according to claim 1, further comprising a funnel-shaped guide lens provided in the light guide and having a funnel shape in which an upper part thereof is wider than an lower part thereof, such that the lower part of the funnel-shaped guide lens is provided in vicinity of the first light source and receives the light radiated from the first light source and the upper part of the funnel-shaped guide lens includes a light emission surface oriented toward the light diffusion pattern of the first image.

\* \* \* \* \*